(12) United States Patent
Bahrami et al.

(10) Patent No.: US 8,073,239 B1
(45) Date of Patent: Dec. 6, 2011

(54) ERROR DETECTION SYSTEM FOR VERIFYING THE CONSTRUCTION OF PAPER BOXES

(75) Inventors: Mehdi Bahrami, Vancouver (CA); Stephen Robinson, Vancouver (CA)

(73) Assignee: Valco Cincinnati, Inc., Cincinnati, OH (US)

( * ) Notice: Subject to any disclaimer, the term of this patent is extended or adjusted under 35 U.S.C. 154(b) by 682 days.

(21) Appl. No.: 12/236,922

(22) Filed: Sep. 24, 2008

(51) Int. Cl.
*G06K 9/00* (2006.01)

(52) U.S. Cl. ......................................... 382/143; 382/141

(58) Field of Classification Search .................. 382/141, 382/143
See application file for complete search history.

(56) References Cited

U.S. PATENT DOCUMENTS

| | | | | |
|---|---|---|---|---|
| 4,430,568 A | * | 2/1984 | Yoshida et al. | 250/358.1 |
| 4,972,494 A | * | 11/1990 | White et al. | 382/143 |
| 5,061,063 A | * | 10/1991 | Casasent | 356/71 |
| 5,978,499 A | * | 11/1999 | Tossel et al. | 382/141 |
| 2006/0013467 A1 | * | 1/2006 | Maeda et al. | 382/141 |
| 2009/0297042 A1 | * | 12/2009 | Nair et al. | 382/216 |
| 2010/0110173 A1 | * | 5/2010 | Kagawa | 348/88 |

* cited by examiner

*Primary Examiner* — Roy M Punnoose
(74) *Attorney, Agent, or Firm* — Gowling Lafleur Henderson LLP

(57) ABSTRACT

A method for inspecting a feature applied to a box blank during manufacture of a paper box, comprising the steps of illuminating at least that portion of box blank including the feature with an illumination source, receiving an image of the illuminated portion of the box blank from at least one optical sensor, varying a characteristic of the illumination source for optically distinguishing between the feature a surface of said portion of the box blank to which the feature is applied, comparing the received image to a stored product profile containing an optimal image of the feature to determine if features in the received image are similar to the features in the stored product profile, and using the comparison to indicate when the box blank does not conform to the product profile.

33 Claims, 22 Drawing Sheets

Figure 3
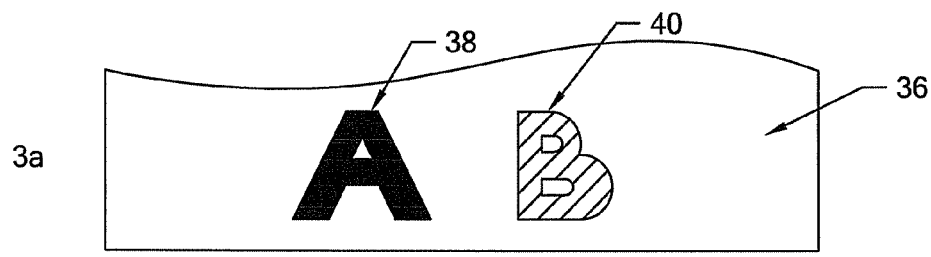
3a
Proper Print
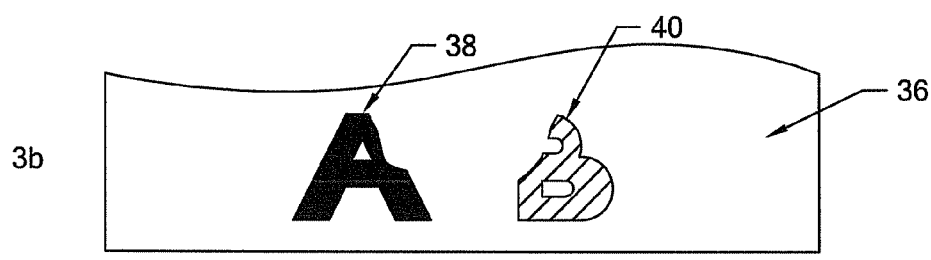
3b
Print Coverage Error
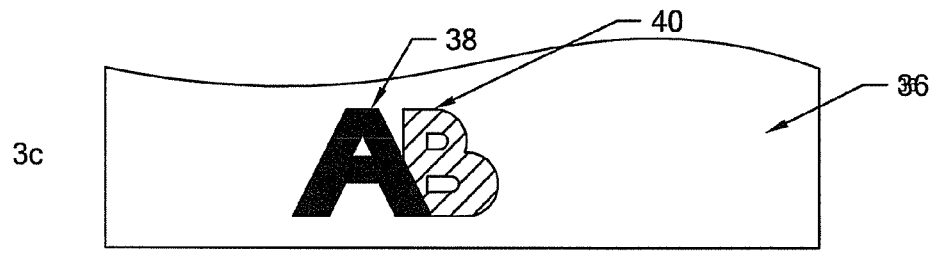
3c
Print Registration Error
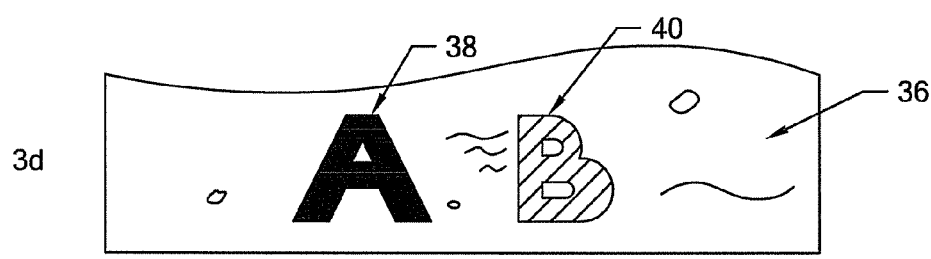
3d
Streaks and Blemishes 4a Proper Pattern 4b Die-cut Stock In 4c Incomplete Die Cut Impression Figure 5
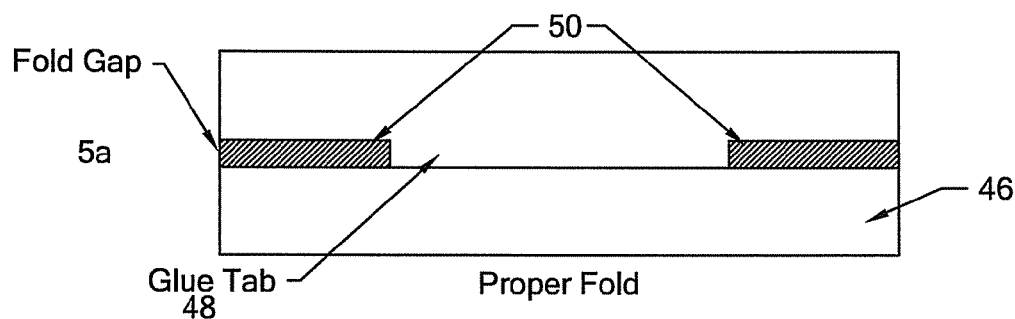
5a — Proper Fold (labels: Fold Gap, 50, Glue Tab 48, 46)
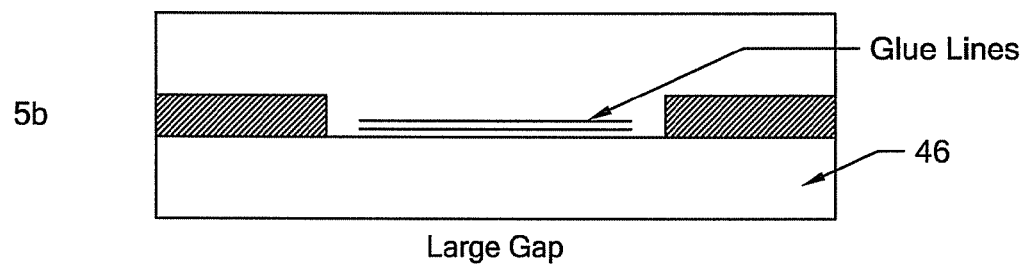
5b — Large Gap (label: Glue Lines, 46)
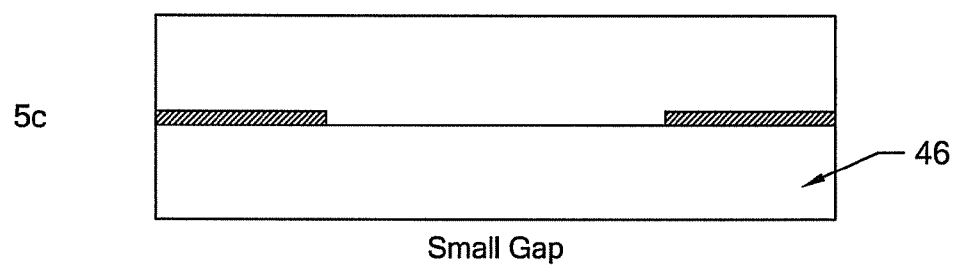
5c — Small Gap (label: 46)
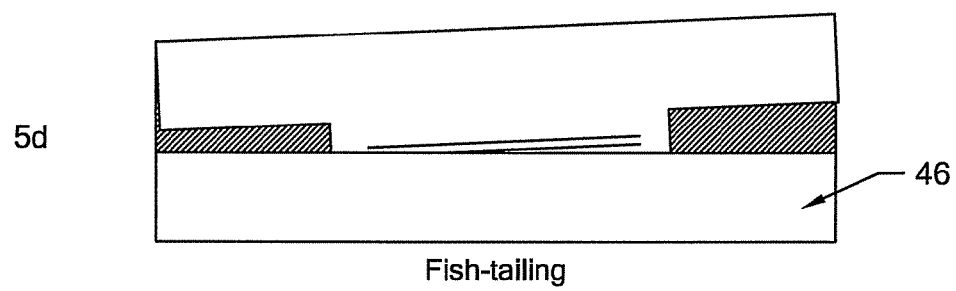
5d — Fish-tailing (label: 46)

Figure 13
13a
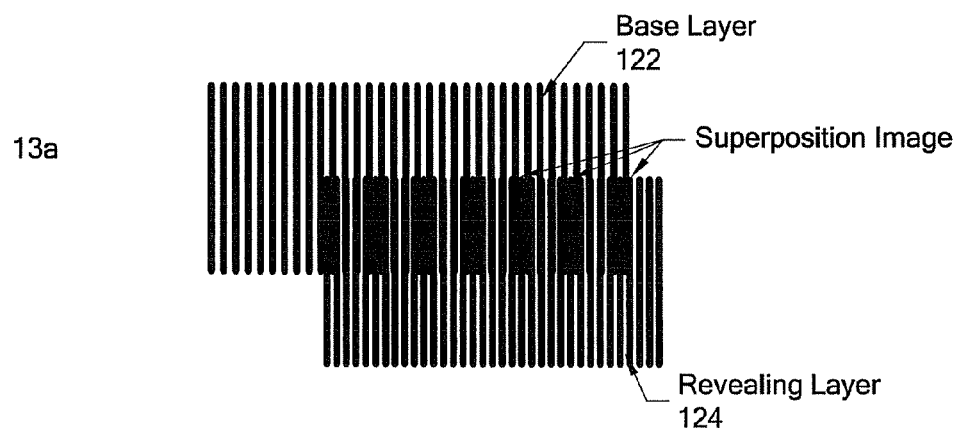
13b
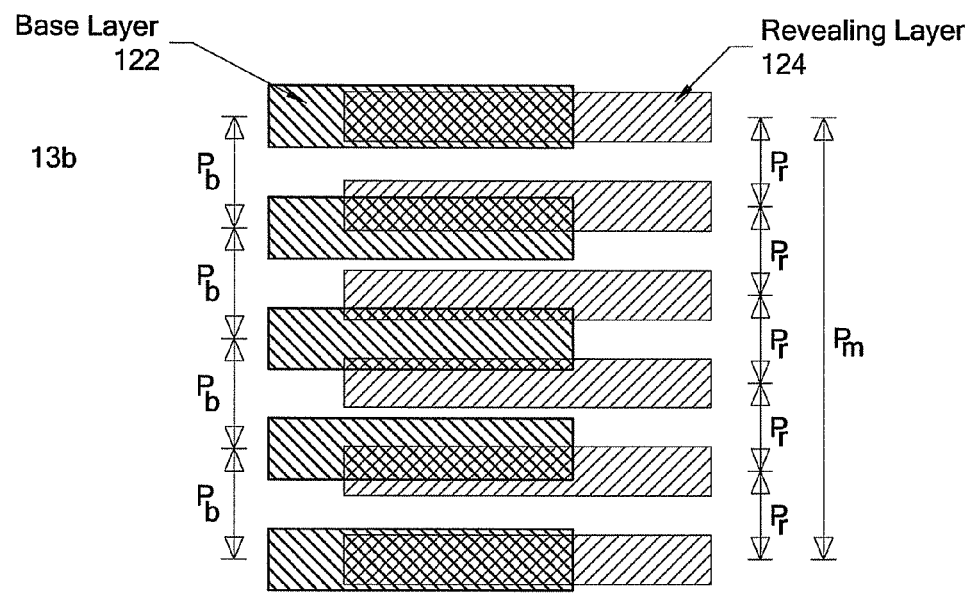

ERROR DETECTION SYSTEM FOR VERIFYING THE CONSTRUCTION OF PAPER BOXES

The present disclosure pertains to optical systems used to verify the construction of paper packaging products, specifically to systems for comparing the quality of gluing, folding and printing operations on paper box blanks against target parameters and optionally for providing a two dimensional representation of the blank for monitoring or archival.

BACKGROUND

Rigid paper containers for product packaging are frequently constructed from boxes or containers folded from corrugated paper. The fabrication of corrugated boxes, folding carton containers, and other packaging materials involves a series of forming operations all of which are subject to errors that can result in the end container being unacceptable for its intended purpose.

With the drive towards greater economic efficiency the manufacture of cardboard boxes has been vertically integrated such that the producer of the original cardboard stock will often perform the box fabrication. In this manner transportation and handling of the packaging is reduced as is the profit lost to third parties. Increases in the automation of box assembly, for example utilizing case erecting equipment, offer the opportunity to reduce cost, however for this automation to be cost effective high quality box blanks must be provided. Poor quality blanks exhibiting inadequate or inappropriate gluing, scoring, incomplete or incorrect die cutting, or poor substrate quality, may cause the case erection equipment to jam or otherwise malfunction resulting in very expensive down time.

A further driver of improvement in box manufacture is the out-sourcing of production and even end product inventories with the goods manufacturer relying on respectively just-in-time delivery of packing materials or indirect shipments of the final packed goods directly to end customers and distribution channels. This increases pressure to assure the quality of the packaging which will enclose the goods as the cost of errors caught late in the supply chain increases with vertical integration and just in time inventory techniques.

A yet further trend is the differentiation of the end goods through its packaging. Increasingly the containers are being relied upon to differentiate the end product through advanced printing, embossing, die-cutting, folding and scoring techniques. As the operations performed on the box both increase in number and complexity, the opportunity for unacceptable errors to be introduced also increases as does the cost of these errors resulting from scrapping the increasingly valuable box.

A further trend is the increased regulation of the packaging industry as the manufacturers who produce regulated product, such as pharmaceuticals, food stuffs and medical equipment companies, themselves face increasing governmental regulation. As regulation of the end product increases, pressure increases on suppliers of packaging to the regulated industry to adopt repeatable and transparent processes and to assure to their customers and their regulators that the goods they ship have followed these processes and have been produced within acceptable tolerances.

As can be seen from the combination of these market pressures, the value of delivering a "perfect box" to an end customer has increased, yet the innovation to assure the delivery of "perfect boxes" has not increased commensurate with the need.

Rigid paper containers, can be made on a variety of equipment. Common fabrication machines include integrated flexo/folder/gluers which receive blanks of cardboard from corrugation machines, print the walls of the blank with decorative patterns, labels and tracking symbols, die cut holes and shapes into the blank, score fold lines, apply glue and then perform initial folding of the blank. Other equipment, such as specialty gluers, may perform folding and gluing, while die-cutters typically perform printing, scoring, and die-cutting. Still others may perform any single or combination of these operations. A characteristic of this equipment is that its design life may be decades in length, and capital may not be available to replace it, thus requiring field upgrade of the equipment if technical innovations are to be applied to improve the equipment's capabilities. As the new capability being upgraded into the machine was frequently not envisioned (nor even feasible) at the time the equipment was originally designed and built, the space available to retrofit functions is by necessity constrained if available at all.

It is in the nature of box blank finishing and box production equipment that it is versatile, being able to produce a variety of boxes or cartons on various substrate stock, of various sizes, base colors and shapes, in varying quantities and employing a range of adhesives the color and properties of which may also vary. Also, the throughput of the production equipment may be changed between runs or within runs as the quality of the substrate and finishing operations varies. Further, judging the quality of the box following the production operations must be done without interrupting or delaying the throughput of the production equipment, permitting rejected boxes to be identified, flagged for rejection, or mechanically sorted from acceptable product into a reject stream.

As should be clear from the afore-described situation, providing assurance against errors in box blank finishing in a transparent, auditable, robust, and easily-used manner has become increasingly important. To address this need a variety of technologies are known for assessing box fabrication operations, however none of these technologies, or methods employing such technologies, adequately addresses the need as has been outlined.

Conventional box blank finishing systems commonly include a sensor for detecting as a single parameter the presence of glues within a specified area along the direction of travel of the box blank, such as that described in U.S. Pat. No. 4,389,969. Such single-degree-of-freedom systems may monitor the level of a single measured parameter along the axis of blank travel such as humidity, capacitance, UV light absorption, light scatter, etc. and check for a strong sensor signal when glue is adjacent to the sensor relative to a weaker sensor signal when an unglued substrate is adjacent to the sensor. While such sensors may be satisfactory for gross verification of the amount of glue present on a blank in a well controlled environment, they are inadequate to check as to whether the pattern of glue laid down is correct. Additionally such single degree of freedom sensing systems are inadequate to capture or display a complete image of the box or for checking other parameters of the box such as print or fold quality. Further and in the case of moisture sensors they may give false positive readings of glue presence if the substrate contains a high level of moisture while being otherwise within specification.

Numerous systems are available which check for registration of printing. While most employ high resolution printer targets intended to be reviewed by a skilled printing machine operator from samples pulled from a print run, some automated print register control systems are available from companies such as Quadtech Inc for use on high speed sheet and web presses. While these systems operate at very high speeds and are capable of controlling printing register to a degree adequate for box manufacture, their capabilities rely on the use of area-scan cameras with unrestricted access to a specific and small field of the substrate. This is not desirable in box manufacturing where the entire box is to be checked for print and die cutting errors ideally by way of a narrow window across the substrate as it passes the camera and illumination source. In addition, automated print register control systems are specific-purposed systems not suitable for print as well as glue or die cut verification.

The present disclosure provides a method and apparatus for improving the delivery of the "perfect box" from the equipment currently used to produce paper-based packaging containers and to perform box blank finishing, in an inexpensive and robust manner in a physically form factor convenient for retrofit to installed equipment.

SUMMARY

In accordance with an embodiment of the invention there is provided a method for inspecting a feature applied to a box blank during manufacture of a paper box, comprising the steps of: illuminating at least that portion of box blank including said feature with an illumination source; receiving an image of the illuminated portion of the box blank from at least one optical sensor; varying a characteristic of the illumination source for optically distinguishing between said feature a surface of said portion of the box blank to which said feature is applied; comparing said received image to a stored product profile containing an optimal image of said feature to determine if features in said received image are similar to said features in said stored product profile; and using said comparison to indicate when the box blank does not conform to said product profile.

In accordance with a further embodiment of the invention there is provided a system for checking the quality of paper box blanks during manufacture, the system comprising:
  at least one optical sensor oriented to view a selected paper box blank on a conveyor line;
  an illumination source with variable wavelength to illuminate the selected box on the conveyor line;
  a control and conditioning module for capturing an image of the selected box from the at least one optical sensor and determining if features in an image received from the at least one camera corresponds to stored values of a target box; and
  a user display for displaying the selected box and identifying to a user if the selected box matches values stored for the input target box.

In accordance with a further aspect there is provided a method of print misregistration detection and quantification in a paper box blank manufacturing line, the method comprising: illuminating a box blank on a conveyor line with an illumination source; receiving at a control and conditioning module an image of the illuminated box blank from at least one optical sensor positioned to view the box blank on the conveyor line; searching the image for registration marks; analyzing the registration marks to determine moiré band comprising a first pattern of lines with consistent spatial frequency along a registration vector and a second pattern of lines with a similar shape to the first pattern of lines and a second consistent spatial frequency different from the spatial frequency of the first pattern of lines, the second pattern of lines printed to overlay the first pattern of lines along the same registration vector as the first pattern of lines to create a constructive interference pattern where the lines of the second pattern interleave with the lines of the first pattern; and determining if misregistration has occurred when said moiré band is out of tolerance from its predicted position.

In accordance with a still further aspect of the invention there is provided system for misregistration detection and quantification in a paper box blank manufacturing line, the system comprising: at least one optical sensor oriented to view a selected paper box blank on a conveyor line; an illumination source with variable wavelength to illuminate the selected box on the conveyor line; a control and conditioning module for: receiving an image of the illuminated box blank from the at least one optical sensor positioned to view the box blank on the conveyor line; searching the image for registration marks; analyzing the registration marks to determine moiré band comprising a first pattern of lines with consistent spatial frequency along a registration vector and a second pattern of lines with a similar shape to the first pattern of lines and a second consistent spatial frequency different from the spatial frequency of the first pattern of lines, the second pattern of lines printed to overlay the first pattern of lines along the same registration vector as the first pattern of lines to create a constructive interference pattern where the lines of the second pattern interleave with the lines of the first pattern; determining if misregistration has occurred when said moiré band is out of tolerance from its predicted position; and a user display for displaying the selected box and identifying to a user analyzed registration mark.

In accordance with a still further aspect of the invention there is provided a method for checking the print registration quality of print on paper box blanks during manufacture, the method comprising: printing on a box blank a first pattern of lines with a consistent spatial frequency along a registration vector; printing on the box blank a second pattern of lines with a similar shape to the first pattern of lines and a second consistent spatial frequency different from the spatial frequency of the first pattern of lines, the second pattern of lines printed to overlay the first pattern of lines along the same print registration vector as the first pattern of lines to create a constructive interference pattern where the lines of the second pattern interleave with the lines of the first pattern; receiving at a control and conditioning module an image of the illuminated box blank from at least one optical sensor positioned to view the box blank on the conveyor line; determining a location of the constructive interference pattern along the registration vector using an optical sensor positioned to view the box blank on the conveyor line; and comparing the location of the constructive interference pattern along the print registration vector to a predicted location.

In accordance with another aspect of the invention there is provided a system for checking the print registration quality of print on paper box blanks during manufacture, the system comprising: an illumination source to illuminate the selected box on the conveyor line; a control and conditioning module for: receiving an image of the illuminated box blank from at least one optical sensor positioned to view the box blank on the conveyor line; determining a first pattern of lines with consistent spatial frequency along a registration vector and a second pattern of lines with a similar shape to the first pattern of lines and a second consistent spatial frequency different from the spatial frequency of the first pattern of lines, the second pattern of lines printed to overlay the first pattern of lines along the same registration vector as the first pattern of lines to create a constructive interference pattern where the lines of the second pattern interleave with the lines of the first pattern; determining a location of the constructive interference pattern along the registration vector using an optical sensor positioned to view the box blank on the conveyor line;

and comparing the location of the constructive interference pattern along the registration vector to a predicted location; and a user display for displaying the selected box and identifying to a user if the selected box matches values stored for the input target box.

BRIEF DESCRIPTION OF THE DRAWINGS

These and other advantages of the present disclosure become more apparent from the following discussion which is provided by way of example only and with reference to the accompanying drawings in which like elements have been assigned like reference numerals and wherein:

FIGS. 3a-3d show diagrams of printing errors commonly found on paper boxes;

FIGS. 5a-5d show diagrams of folding errors commonly found on paper boxes;

FIGS. 13a-13b illustrate a moiré effect technique used by the print and die cut verification subsystem=;

DETAILED DESCRIPTION

Figure 1:
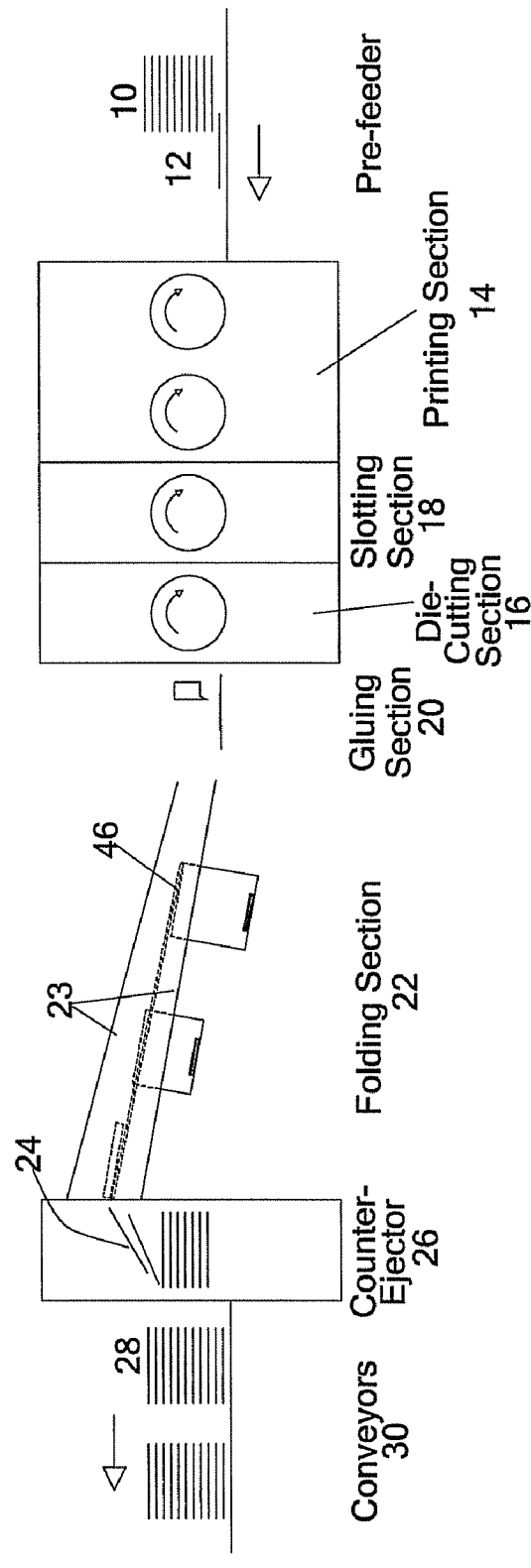
FIG. 1 is a block diagram showing an arrangement of components of a typical flexo-folder-gluer converting line for the manufacture of paper boxes.
Figure 2:
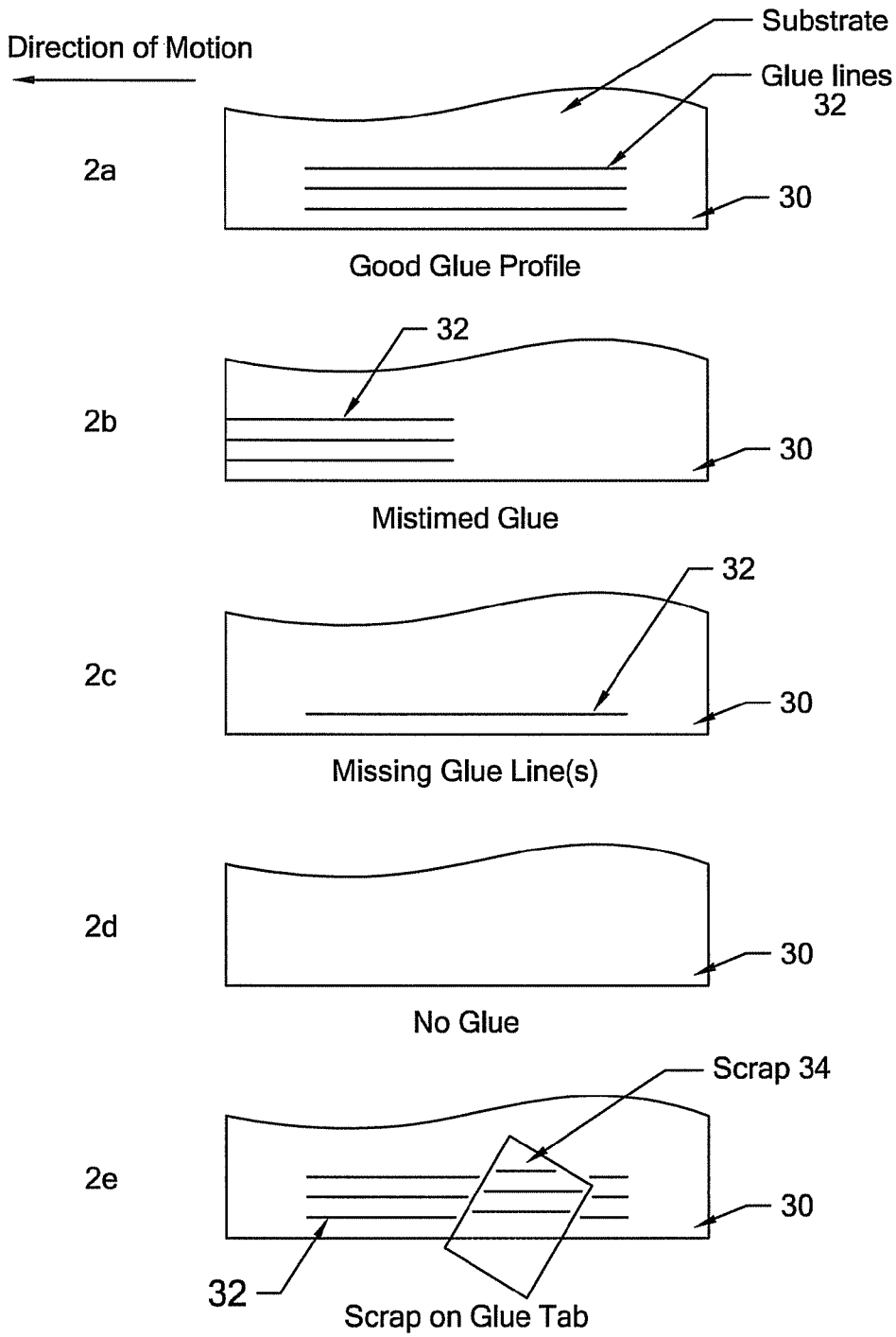
FIGS. 2a-2e show diagrams of glue application errors commonly found on paper boxes.
Figure 4:
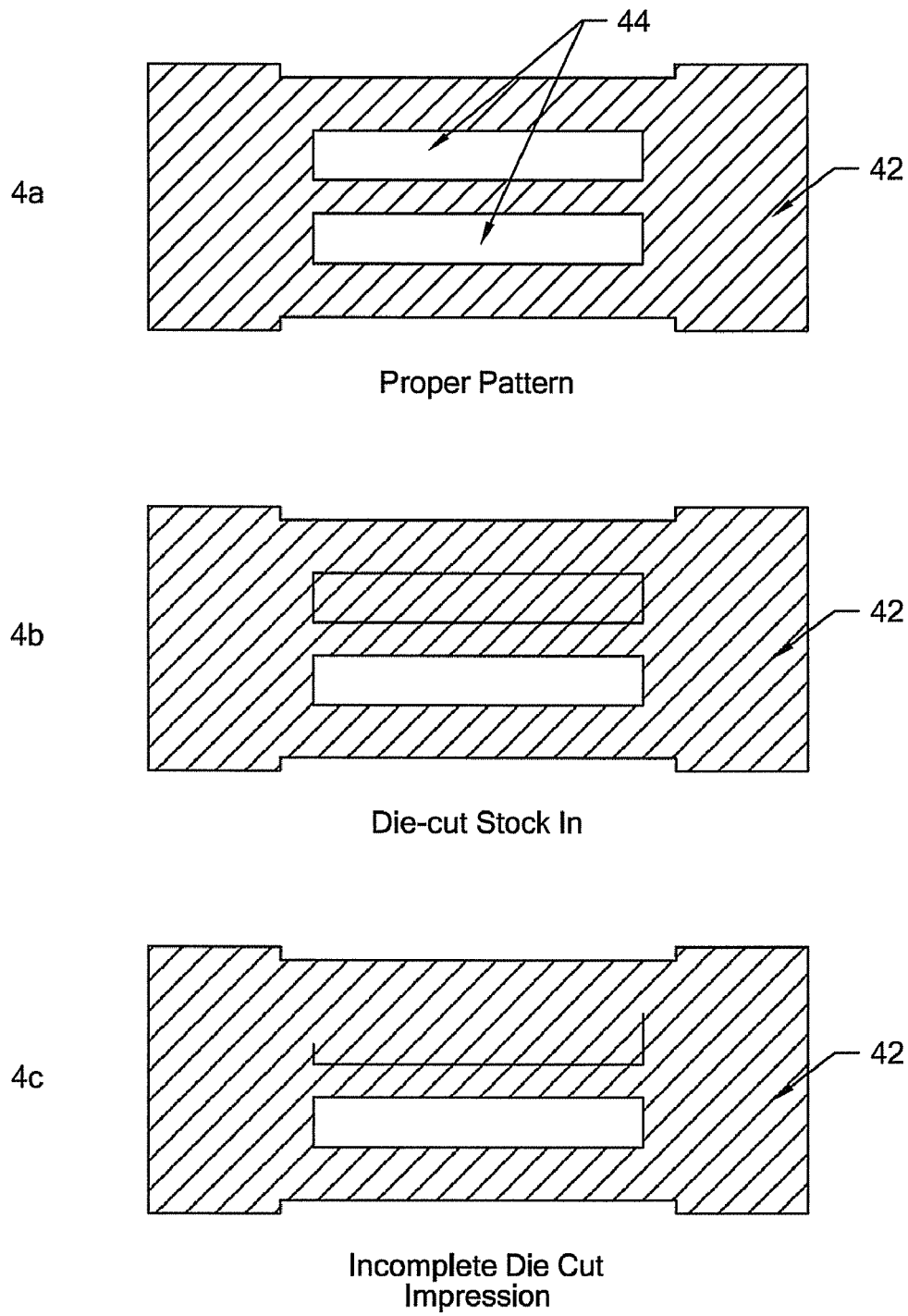
FIGS. 4a-4c show diagrams of die cutting errors commonly found on paper boxes.

In the following description like numerals refer to like structures in the drawings.

The present disclosure relates generally to a system and method for detecting errors in the fabrication of boxes or containers fabricated from blanks made of a paper or bonded paper substrate.

It should be noted that whereas this disclosure will refer to the steps and improvements made in the fabrication of a box or carton, this is intended for illustration only as the disclosure is generally useful in the creation of any formed paper article formed through one or more of the operations of printing, die cutting, slotting, folding, or gluing, be it a packaging container, a point-of-sale-display for marketing, a paper structural shape, etc.

FIG. 1 shows a schematic diagram of a flexo-folder-gluer machine 2 commonly used for finishing a paper box blank into a folded carton ready for filling and final assembly. In operation, the flexo-folder-gluer machine 2 is presented with a stack of box blanks 10 at one end, selects and passes unprocessed blanks 12 linearly, singularly and sequentially through a sequence of operations or finishing steps of printing, die-cutting, slotting, gluing and folding respectively performed by printing section 14, die-cutting section 16, slotting section 18, gluing section 20 and folding section 22. At the end of the flexo-folder-gluer machine 2 the processed blanks 24 are restacked into finished stacks 28 of folded finished boxes in counter-ejector section 26 for final delivery to output conveyor 30. As has been previously noted and should be apparent, the operations performed by the sections typified in this flexo-folder-gluer may be re-arranged or deleted as required by the specific needs of the box fabrication and, as such, the flexo-folder-gluer machine 2 in FIG. 1 is a common but not exclusive example of a box blank finishing machine to which the present disclosure pertains.

Each operation performed by a box blank finishing machine is subject to variance around a desired target outcome. When the variance in each operation performed, individually or in aggregate, exceeds an acceptable level from the target outcome, the box must be rejected as unacceptable. Referring to the flexo-folder-gluer machine 2 shown in FIG. 1, the results of common failures in these operations are shown respectively in FIGS. 2, 3, 4, and 5 as described in more detail below.

FIGS. 2a and 2e show common gluing errors. FIG. 2a illustrates a desired gluing pattern applied to the substrate of box blank 30 comprising a series of glue lines 32 running parallel to the direction of motion of box blank 30 and along one side edge of box blank 30, such glue lines 32 having been previously applied by a glue nozzle in glue section 20. Parameters which characterize this desired glue pattern include the start and stop positions of the glue lines 32, the position of glue lines 32 relative to the side edge of box blank 30, the thickness of the glue lines 32, and the accuracy and completeness of the pattern relative to the desired target pattern. FIG. 2b shows a common gluing error where the timing of the glue application in glue section 20 relative to the position of box blank 30 is incorrect resulting in a glue pattern incorrectly positioned on box blank 30. FIGS. 2c and 2d show common glue errors where the glue nozzle of glue section 20 has become partially plugged, or otherwise inoperable, or a gross timing error has occurred, and thus have failed to apply glue in the desired pattern to box blank 30. FIG. 2e show a common error where glue lines 32 have been laid down over top of a waste paper scrap 34 which subsequently falls away thus reducing the adhesion available from glue lines 32 or possibly otherwise marring the appearance or function of box blank 30.

FIGS. 3a-3d show common printing errors encountered in the finishing of a box blank 36 in the flexo printing section 14 of flexo-folder-gluer machine 2. Such printing is commonly performed on box blanks through use of flexographic printing where distinct flexographic cylinders are employed, one for each color to be printed, and where each flexographic cylinder provides a relief surface to be brought in contact with the box blank 36 where said relief surface is shaped in the pattern desired for printing and coated with ink of the desired color to be printed by that flexographic cylinder. As such the box blank 36 sequentially passes beneath and is in contact with each flexo cylinder receiving ink of the desired color and pattern as provided by the cylinder. In FIG. 3, first print element 38 is presumed to be produced by one flexo cylinder and second print element 40 is presumed to have been produced by a second flexo cylinder both to be related to each other on box blank 36 as shown in FIG. 3*a*. The arrangement of multiple flexo cylinders permits patterns of varying complexity and quality to be printed on the box blank where increasing the complexity or desired quality of the printing frequently gives rise to increasing print errors, such errors including but not limited to inadequate print coverage as shown on both first and second print elements 38 and 40 in FIG. 3*b*, unacceptable registration of one flexo cylinder to another as shown on second print element 40 being translated towards first print element 38 in FIG. 3*c*, or defects in the patterns laid down by one or more of the flexo cylinders around or upon first print element 38, second print element 40 or otherwise on box blank 36 in FIG. 3*d*. These defects may occur singularly or in combination, be present in any area of the box blank, and may be a result of translational error in either the cross-blank or along-blank directions, a rotational error of the print with respect to box blank 36, or some combination of translational and rotational error. Advantageously the present disclosure permits the full area of box blank 36 to be inspected and verified, printing errors as described identified and quantified, and the resulting errors to be displayed to the operator, an image of the box blank to be captured for future retrieval and analysis, and the failing box blank to be marked for subsequent removal.

For clarity, whereas a flexographic printing function is described in printing section 14, any printing technique including and not limited to flexography, gravure, lithography, electro-photography, ink jet, or letterpress printing performed either separately or in combination, and as a part of an integrated box blank finishing machine or as a stand alone operation in a dedicated printing device, may exhibit the errors of FIG. 3. Thus, a system and method are provided for checking errors of the printing step, and hence the quality, regardless of the printing technique or the degree or nature of the integration of the printing operation with other box blank finishing operations. Further the current system and method may be used to quantify the magnitude of the print error and identify for the user the printing step or steps likely to have caused such error.

FIGS. 4*a*-4*c* shows errors commonly found following die cutting and slotting operations performed in sections 16 and 18 respectively of a flexo-folder-gluer machine 2 both operations of which are intended to perform mechanical penetration and separation actions to box blank 42. FIG. 4*a* illustrates the desired die cutting of box blank 42 wherein two rectangular holes 44 have been made in box blank 42 and the resulting waste substrate removed from box blank 42 by the die cutting section 16 of the flexo-folder-gluer machine 2. Inadequate penetration and slitting of the substrate of box blank 42, or incomplete removal of the resulting rectangular waste substrate from box blank 42, or both can result in unacceptable error of the operation as illustrated in FIGS. 4*b* and 4*c* and the need to identify the box blank for subsequent rejection.

Once the box blank surface has been prepared, the final folding step of the flexo-folder-gluer machine 2 may be performed. As shown in FIG. 1, the folding section 22 of the flexo-folder-gluer machine 2 provides rails 23 which bend box blank 46 along scribed or slotted folds in box blank 46, folding box blank 46 upon itself bringing the opposed edges of the box blank 46 into contact at prepared glue tab 48, and bonding the edges of box blank 46 one to the other thus forming a closed but collapsed parallelepiped from box blank 46. FIGS. 5*a*-5*d* illustrate how box blank 46 appears from below the flexo-folder-gluer machine 2 at the end of folding section 22 when the edges of box blank 46 have been properly folded and bonded to each other thus providing symmetric and parallel fold gaps 50 between the edges of box blank 46 on either side of glue tab 48. Common errors in folding are illustrated in FIGS. 5*b*, 5*c* and 5*d* where the displacement between the edges of box blank 46 as specified by the width of fold gaps 50 are too large, too small, dissimilar or non-symmetrical respectively, when box blank 46 has been bonded at glue tab 48. In any of these folding errors, the cross-section of box blank 46 when it is "un-collapsed" for final packing may be asymmetrical, conic or both and thus box blanks 46 displaying out of tolerance fold gaps 50 must be rejected.

Accordingly, an error detection system is described below. The disclosed error detection system is for use with the flexo-folder-gluer system 2 described above. However the error detection system is configurable for use on any box blank finishing machine, similar but not limited to the example flexo-folder-gluer machine 2 of FIG. 1. The error detection system provides for one or more of measuring the variance from desired target parameters of each operation of the box blank finishing machine upon the unprocessed box blank 12, rejection of failed processed box blanks 24, displaying an image of each processed box blank 24 on exit from the box blank finishing machine, and storing a representation of the image and the measurements relative to target parameters of each processed box blank 24 for archival storage or subsequent analysis.

Figure 6:
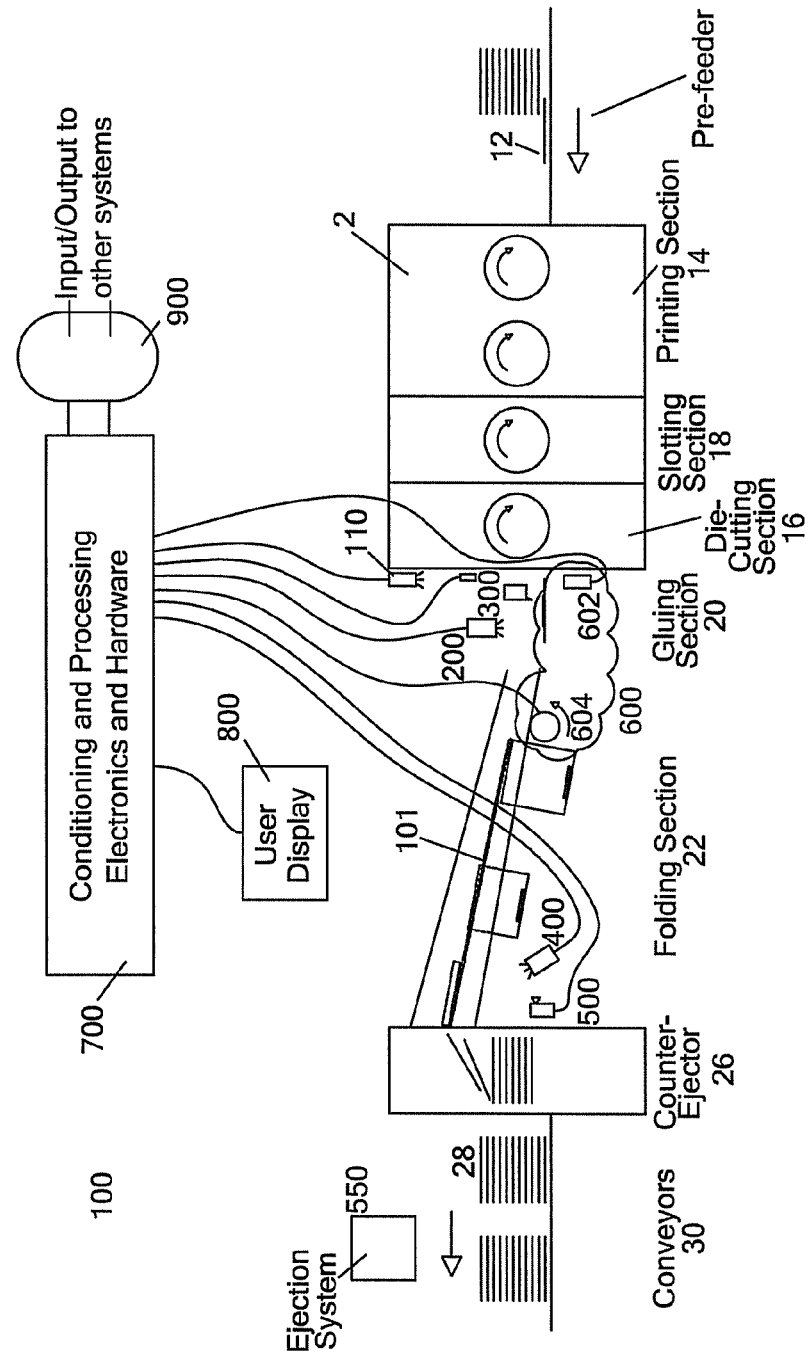
FIG. 6 is a block diagram showing components of an error detection system for a flexo-folder-gluer.

FIG. 6 is an overview diagram of the system 100 for detecting errors in box blank fabrication showing the components of the system as applied to a flexo-folder-gluer machine 2. The error detection system 100 comprises print and die cutting verification subsystem 110, one or more glue verification subsystems 200, substrate deflection measurement subsystem 300, fold verification subsystem 400, reject marking subsystem 500, reject sorting subsystem 550, synchronization elements 600, control and conditioning module 700, user display 800 and input/output signals 900.

Figure 7:
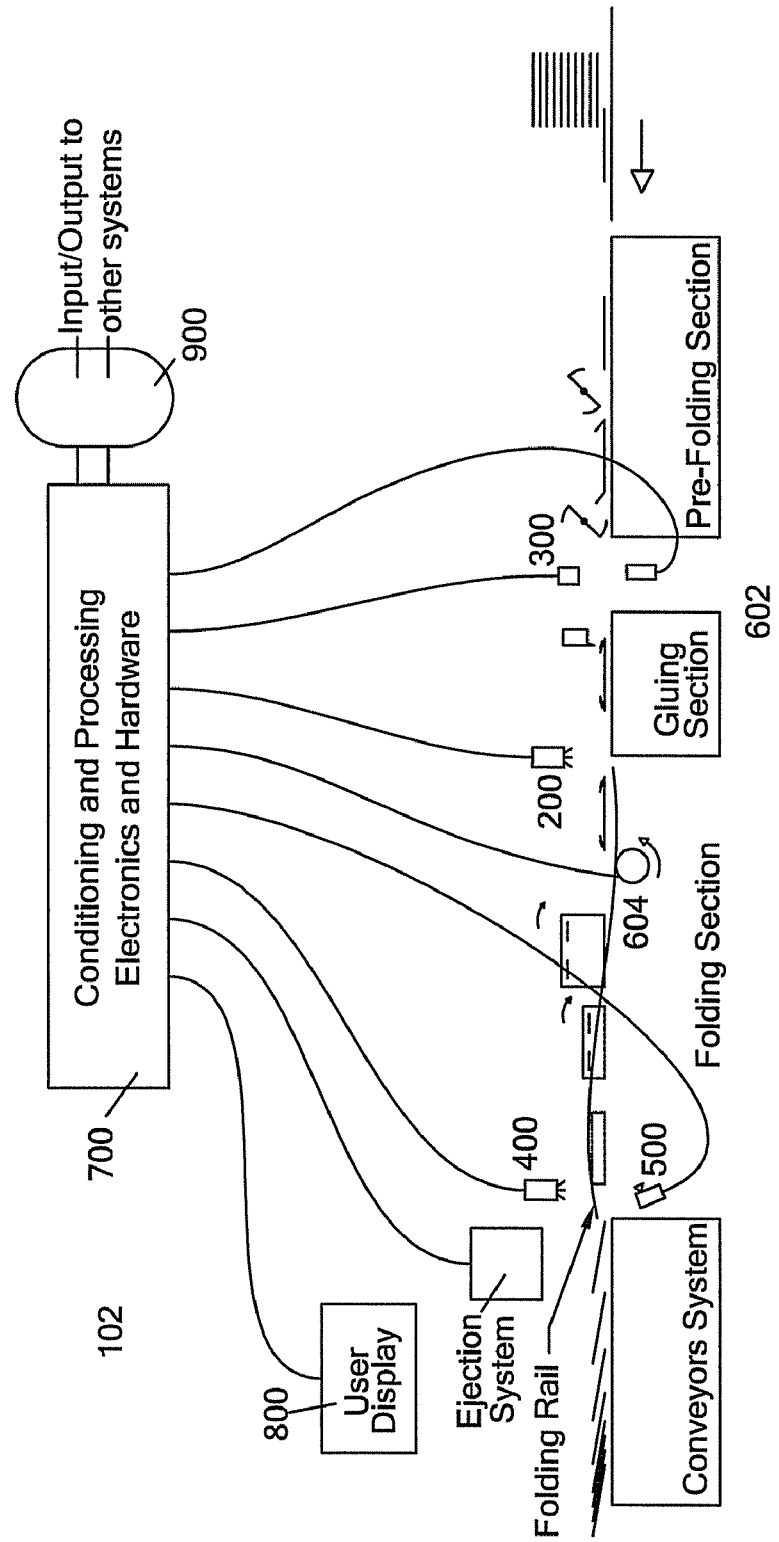
FIG. 7 is a block diagram of the error detection.

FIG. 7 is another embodiment 102 of the error detection system configured for use on a folder-glue device 4. The system 102 comprises elements similar system 100 further comprising one or more glue verification subsystems 200, substrate deflection measurement subsystem 300, fold verification subsystem 400, reject marking subsystem 500, synchronization elements 600, control and conditioning module 700, user display 800 and input/output to other systems 900. System 102 is introduced as an example only. The following disclosure refers to system 100 however system 102 may or such similar modifications resulting from the order, addition or deletion of the box blank finishing operations are equally applicable.

Returning to FIG. 6, the control and conditioning module 700 of system 100 comprise electronic circuitry and software for receiving from the user through the input/output interface 900, through touch screen functionality on user display 800, or in some other manner, the parameters of the desired target box blank to which each processed box blank will be compared along with data related to the substrate and glue material characteristics or the preferred optical settings for illumination of the box blanks by the verification subsystems, storing as internal records the preferred illumination settings of the verification subsystems present and the parameters of the target box blank to which the scanned images of each box blank will be compared, sending output signals to the verification subsystems present representative of the desired illumination and camera settings, receiving as input signals from the verification subsystems and the synchronization elements 600, data and analogue signals representative of the characteristics of the box blanks being processed, and the location of the box blank in, and the general status of, the box blank finishing machine, conditioning the input signals in a manner appropriate for optimizing signal/noise and other performance characteristics of said input signals, recalling the parameters of the target box blank and optical settings and comparing the received input signals versus target data, compiling the input signals into data representative of a two dimensional image of the box blank, and sending control and performance information as well as image information compiled from one, or more, box blank to any and all of the verification subsystems, user display 800, and input/output signals 900, such information representative of the two dimensional scan of a scanned box blank's physical and optical characteristics and the results of the comparison of the conditioned input signals to the stored target parameters for the box blanks being finished.

The control and conditioning module 700 may be implemented in a variety of manners including but not limited to the combination of application software running on a computer suitably hardened for use in industrial applications and otherwise equipped with appropriate input and output communication ports suitable for use in the described application.

The synchronization elements comprise sensors, encoders and conditioning module appropriate for providing control and conditioning module 700 with information pertaining to the location and speed of box blanks 12 as they move through the box blank finishing machine. Such synchronization elements 600 comprise an optical eye 602, as is commonly known in the art or otherwise similar to component product WORLD-BEAM QS18™ manufactured by Banner Engineering, for sensing the leading edge of box blank 12 as it passes through the box blank finishing machine. Rigidly mounted above or below the path of box blank 12, optical eye 602 provides a real-time signal to control and conditioning module 700 representative of whether a box blank 12 is passing in front of said optical eye or not, thereby providing control and conditioning module 700 indication as to where a box blank 12 is with respect to the conveyor belts 101 of the box blank finishing machine. Synchronization elements 600 also includes encoders 604, using electro-optical, electro-magnetic or other technology, to provide a signal representative of a physical position of a machine element, which allows for the determination of the linear location of the conveyors used to move box blank 12 through the finishing operations. Encoders 604 may more explicitly comprise rotational encoders mounted to the drive pulleys or wheels of the conveyors 101 wherein the rotational encoders provide to control and conditioning module 700 a digital signal describing the absolute angular location of the conveyor drive wheel and a digital signal proportional to the rate of change of angular speed of the conveyor drive wheel, from which control and conditioning module 700, in combination with the signal generated by optical eye 602, may calculate the absolute location and speed of the conveyor and one or more of box blanks 12 attached thereto.

User display 800 provides the user with a visual display capability for optionally displaying a two dimensional (2D) image or scan of every box blank 12 processed by the box blank finishing machine in which the invention is incorporated. Alternatively, the user display 800 may be instructed to display only images of rejected box blanks. Advantageously, user display 800 may display an image of processed box blanks 24 overlaid with an image of the desired target box blank so that actual deviations from the target can be readily conveyed for user training and operational feedback. User display 800 may also include touch screen capability usable by the user to input ideal box parameters, call up system features such as archival records and print output, etc.

System 100 includes input/output signals 900 capable of receiving digital or analog electrical signals representative of desired system settings including target box parameters, acceptable tolerances for each operation to be performed and measured on the box blanks 12, job data, and data related to box blank substrate and glue parameters including optical properties, type, etc. Output signals may be sent from system 100 through input/output signals 900 appropriate for archival storage of the scanned box blank images, box blank finishing machine status and performance, job performance, etc.

Figure 8:
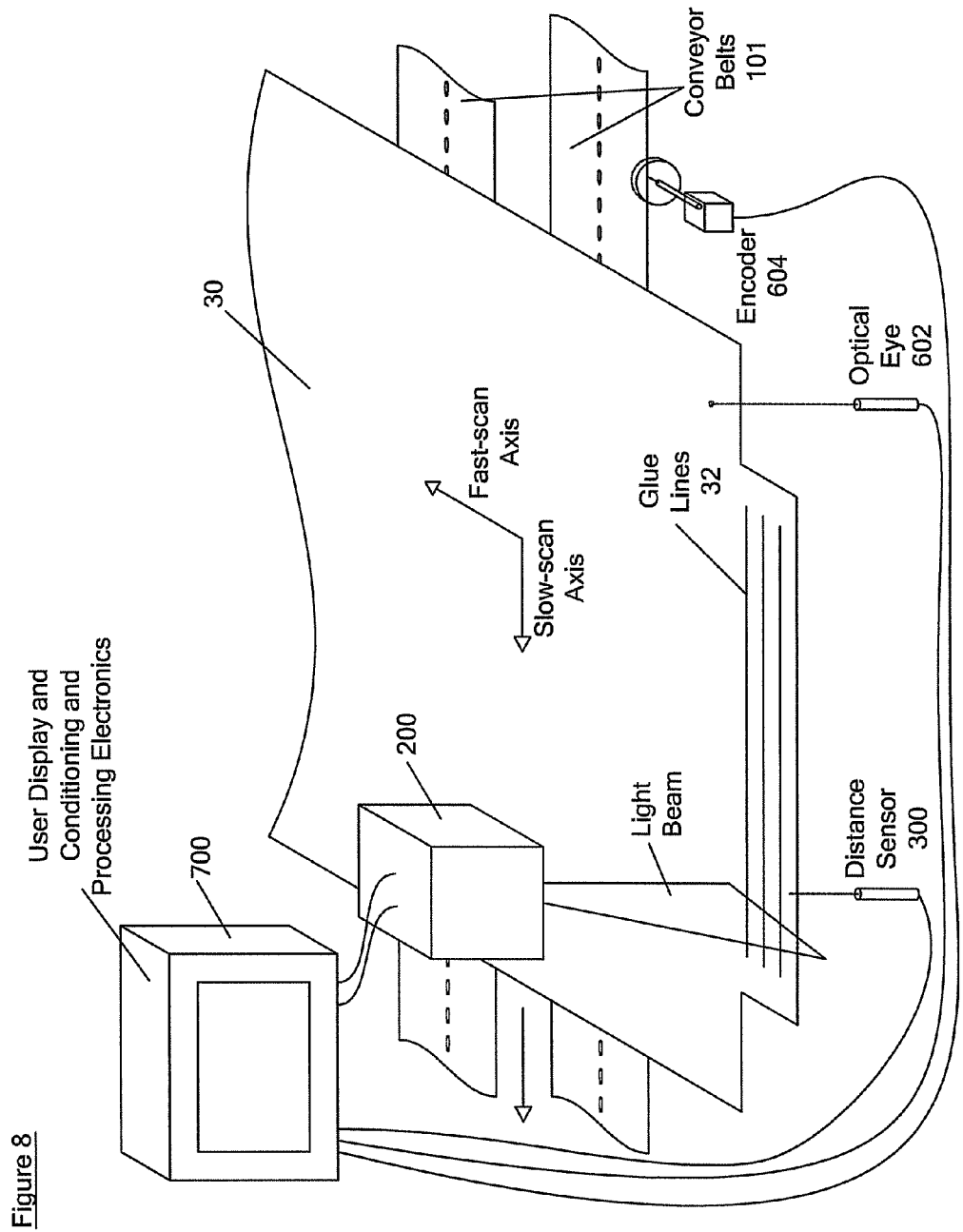
FIG. 8 is a block diagram of a glue verification subsystem.

FIG. 8 is a diagram showing the glue verification subsystem 200 and its relationship to other elements of the error detection system. The glue verification subsystem 200 may be rigidly mounted to the box blank finishing machine in such a manner as to provide unobstructed visual access to the glued area of the box blank 30 as it is passed along by the conveyors 101 of the box blank finishing machine and immediately following the application of the glue lines 32 to the box blank 30. The glue verification subsystem 200, including illumination, electro-optical components and conditioning module, all as will be described, provides data signals to and receives control signals from the control and conditioning module 700. The data signals are representative of the visual image of physical features of the box blank 30 as it passes beneath the glue verification subsystem 200 in a direction of travel hereafter referred to as a "slow-scan" direction, such physical features including lines or patterns of glue lines 32 placed upon box blank 30.

As described further below, a one dimensional, "line scan" CCD camera may be utilized wherein the CCD camera captures image data of the box blank 30 at a physical resolution commonly of 250 pixels per inch in the "fast-scan" direction—the direction in the plane of the box blank perpendicular to the slow-scan direction—adequate to judge satisfactory and non-satisfactory features in glue lines 32. Upon a polled request of glue verification subsystem 200 from control and conditioning module 700, an image of a stripe of box blank 30 perpendicular to the direction of motion of box blank 30 is read into the pixels of the CCD camera, converted to grey scale values representative of the light being reflected onto the pixels of the CCD camera by the imaged stripe of the box blank 30, and said grey scale values are sent to control and conditioning module 700. By advancing box blank 30 beneath glue verification subsystem 200 and then polling successive images in the fast scan direction of glue lines 32 into control and conditioning module 700, a two dimensional array of data representative of the visual image of glue lines 32 on box blank 30 may be built up in control and conditioning module 700 for analysis. The polling request made by control and conditioning module 700 is dependent upon, and synchronized with, signals received by control and conditioning module 700 from the synchronization elements 600. By way of illustration, and as has been previously described, the signals sent from the synchronization elements 600 are representative of the physical location of box blank 30 with respect to the box blank finishing machine and glue verification subsystem 200 attached therewith. Thus the image of box blank 30 scanned into the CCD camera of glue verification subsystem 200 is synchronized with the physical translation of box bank 30 with respect to glue verification subsystem 200. As the location on box blank 30 is accurately known by control and conditioning module 700, this synchronization assures that image data for box blank 30 is requested and read into control and conditioning module 700 in a manner appropriate to build an accurate 2 dimensional replica of box blank 30 in control and conditioning module 700 at a resolution in the slow scan direction adequate to discern glue and substrate features to verify proper application of the glue, and that the constructed 2 dimensional replica is scaled accurately in the slow scan direction. This is advantageous versus existing systems which sample properties of the glue lines 32, or read images of the box blank 30, at a consistent time frequency preset with respect to the target speed of the box blank finishing machine as these existing systems may improperly locate the sampled properties or readings if the speed of box blank 30 is different from the speed assumed when the consistent sampling time interval is established. Such scaling errors in the slow scan direction are unacceptable if a 2 dimensional representation of box blank 30 is to be accurately compared to a desired target box blank or is to be displayed through user display 800.

It is noted that the image to box blank synchronization provided by synchronization elements 600 is advantageous to the operation of all verification subsystems, and to the operation of system 100 overall, and is not limited in this advantage to use with the glue verification subsystem 200.

Figure 9:
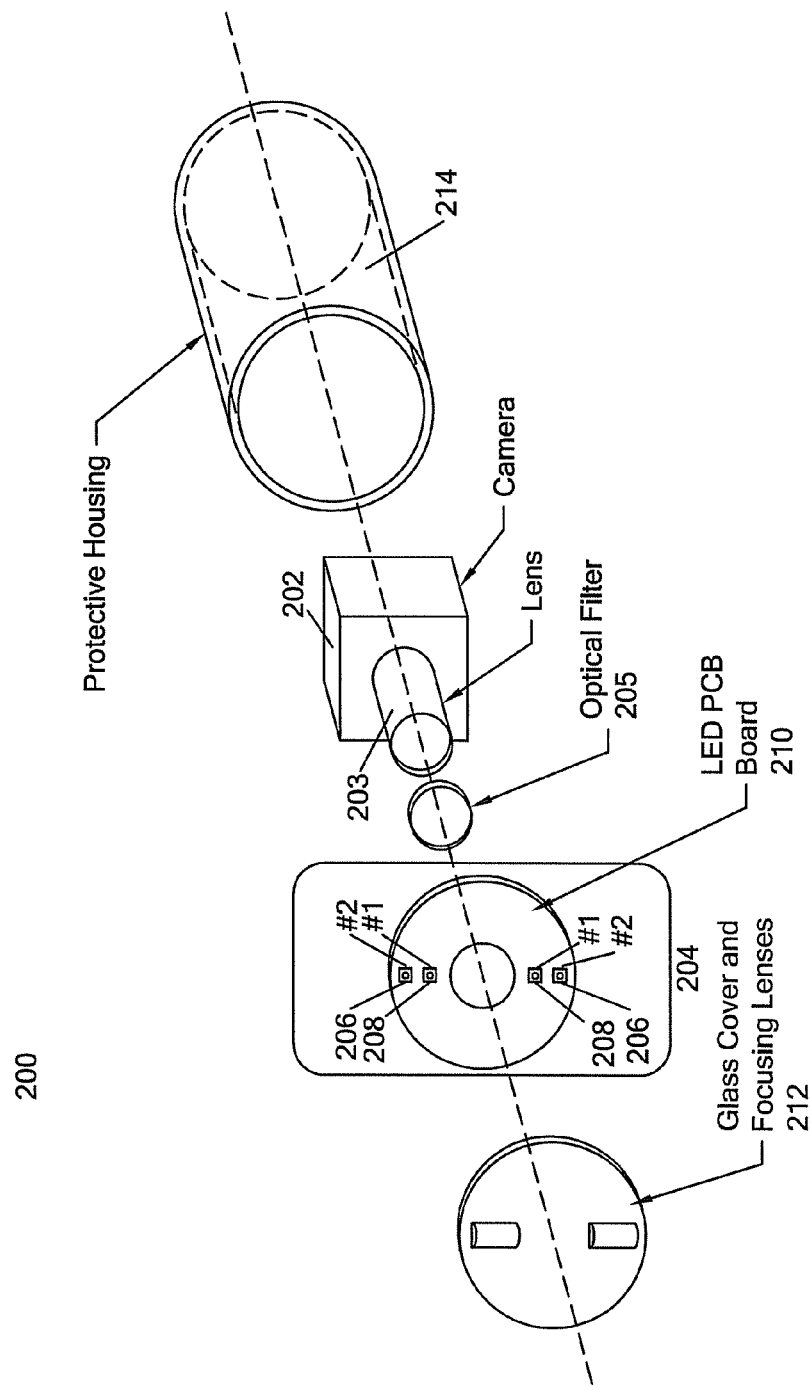
FIG. 9 is a block diagram the electro-optical elements of the glue verification subsystem.

Turning now to FIG. 9 there is shown a detailed diagram of the elements of glue verification subsystem 200, comprising camera 202, illumination source 204, focusing lenses 212 and housing 214. Glue verification subsystem 200 may also optionally include optical filter 205.

The camera 202 is a digital imaging camera for transforming optical images into digital sensor levels, or pixels, as is commonly known to the art of machine vision. The camera 202 may be either of the line-scan or area-scan variety but is preferably a CCD camera of line scan technology similar to DALSA Corporation part #SG-1x-01k40, which, by comparison to area-scan cameras of similar capacity, simplifies stitching of the resulting images by control and conditioning module 700.

Arranged axially around the camera lens 203 is an illumination source 204 with illumination characteristics which may be varied to change the characteristics of the output light from illumination source 204. Such illumination characteristics of specific frequencies in the spectrum of the output light may include, but are not limited to, the intensity, such as may be useful for checking contrast in features of the box blank, and polarity, such as may be useful for reducing glare from an image of a box blank. Illumination source 204 comprises (printed circuit board) PCB 210 and a plurality of type A light emitters 206 and type B light emitters 208 mounted to the PCB 210. The PCB 210 serves to provide conditioning circuitry for the type A and type B light emitters 206 and 208 respectively permitting, on a signal from the control and conditioning module 700, the relative illuminating power of the type A and type B light emitters 206 and 208 respectively to be varied in intensity both absolutely and relative to each other. The location of type A light emitters 206 and type B light emitters 208 may be distributed around the axis of camera lens 203 such that the combination of light from type A light emitters 206 and type B light emitters 208 is homogenous on output from glue verification subsystem 200.

The selection of the illumination wavelengths of type A and type B light emitters 206 and 208, and their illuminated intensities, is based on the measured optical properties of typical glues and substrates. The goal is to illuminate the glue and substrate to maximize the contrast between the glue and the substrate material of the box blank 30, while still providing a human-recognizable image of glue applied to the substrate which can be displayed on user display 800. By doing so, and not just displaying images of a glue line on a black background (a thresholded binary image), the operator is better able to determine the cause of a gluing error. For example, the operator can conclude that there was scrap on the box blank 30, or the operator can observe that glue lines 32 had started/stopped prematurely in relation to the substrate.

The table below provides an example of the wavelengths and the corresponding intensity settings of light emitters for a selection of glue and substrate pairs. The intensity settings provided corresponds to the relative optical power between the two light emitters. The actual intensity depends on the distance of the camera 202 and illumination source 204 from the substrate, their relative angle, the sensitivity of the camera 202 to the specific wavelengths, etc. The goal, however, is to adjust the intensity of the light emitters 206 and 208 so as to make use of the full response band of the pixels of camera 202, that band being from the intensity that causes the camera 202 to report to control and conditioning module 700 absolute lack of light received by the pixels of camera 202, to the intensity that causes the camera 202 to report to control and conditioning module 700 pixel saturation of the pixels of camera 202. In the table, for glue with UV additive, the selection of the light emitter wavelength depends on the optical characteristics of the UV additive. Ideally, the emitter wavelength is selected to match the response of the UV additive. For instance, if the UV additive fluoresces best at a wavelength close to 400 nm, then blue (400 nm) emitters are used.

|  | Brown Substrate | White Substrate | Fluorescent White Substrate |
| --- | --- | --- | --- |
| Pink Glue | Blue (400 nm) 90% Green (525 nm) 10% | Blue (400 nm) 0% Green (525 nm) 100% | Blue (400 nm) 0% Green (525 nm) 100% |
| Green Glue | Red (640 nm) 80% Blue (400 nm) 20% | Red (640 nm) 100% Blue (400 nm) 0% | Red (640 nm) 100% Blue (400 nm) 0%) |
| White Glue | Blue (400 nm) 80% Red (640 nm) 20% | Blue (400 nm) 100% Red (640 nm) 0% | Blue (400 nm) 100% Red (640 nm) 0% |
| White Glue w/UV additive | Blue (400 nm) or UV (360 nm) 80% Red (640 nm) 20% | Blue (400 nm) or UV (360 nm) 90% Red (640 nm) 10% | Blue (400 nm) or UV (360 nm) 100% Red (640 nm) 0% |

Having two wavelengths of light available, and with each wavelength independently and variably controllable in illuminative power, glue lines 32 can be sufficiently detected on, and discerned from, the various substrates commonly used in box blank 30. For this reason, illumination source 204 consists of at least two channels each for controlling their corresponding type A emitters 206 or type B emitters 208. For example, one channel would provide blue (400 nm LEDs) for type A light emitters 206 and the other red (640 nm LEDs) for type B light emitters 208. Permitting the control and conditioning module 700 to vary the illumination of light emitters 206 and 208 dynamically allows for optimization of the contrast between the glue lines 32 and substrate of the box blank 30 imaged by the camera 202. Such contrast optimization can be performed by having the control and conditioning module 700 read an internal look-up table of light settings, said light settings being either previously determined by experimentation to be optimal for the target combination of glue and box blank substrate or said light settings having been created at the start of a production run through the steps of:

Causing control and conditioning module 700 to read a set of baseline illumination intensity settings for the type A light emitters 206 and the type B light emitters from an internal record and to communicate this baseline illumination intensity setting to the glue verification subsystem 200 such that the type A emitters and Type B emitters illuminate with an intensity corresponding to this baseline illumination intensity setting presenting before glue verification subsystem 200 a target box blank 30 with no glue lines so as to have the image of the unglued substrate imaged by camera 202 causing control and conditioning module 700 to read a first grey scale signal value from camera 202 of the image of the unglued substrate of box blank 30 presenting before glue verification subsystem 200 a target box blank 30 with glue lines 32 present so as to have the image of the glue lines 32 imaged by camera 202 causing control and conditioning module 700 to read a second grey scale signal from camera 202 of the image of the glue lines 32 on box blank 30 causing control and conditioning module 700 to subtract the second grey scale signal value from the first grey scale signal value thereby creating a difference value being a contrast value which is captured by control and conditioning module 700 along with said baseline illumination settings corresponding to the contrast value repeating the aforementioned steps for each and every combination between zero illumination setting and maximal illumination setting for each type of light emitters, such combinations being changed in steps of 10% positively and negatively around the baseline illumination setting thereby creating a table of contrast values each with a corresponding set of illumination settings causing control and conditioning module 700 to find the highest contrast value in the table of contrast values and the corresponding illumination causing to be applied for the balance of a production run, or until reset by the operator, this set of optimal illumination settings to the light emitters of glue verification subsystem 200.

The aforementioned method for optimizing contrast is simplistic and provided for example only. Additional and alternative algorithms to optimize the optical difference between glue and substrate images may be used including and not limited to rate of change of contrast techniques, image sharpening, dynamic thresholding, etc.

Further, the look up table for optimal settings of illumination source 204 can be established over an initial sample of box blanks at the start up of a run, and additionally or alternatively at several points along the glue lines 32 of each box blank 30 in the initial sample, by varying the illumination intensity values and determining the optimal contrast levels as previously described. Alternatively, different settings of illumination source 204 can be sequentially applied to the first box blank passing through—i.e. Setting 1 over the first $\frac{1}{3}^{rd}$ of the box, Setting 2 over the next $\frac{1}{3}^{rd}$, etc. —and the results compared in the control and conditioning module 700 for preferential results then applied to the balance of the run. In any of these aforementioned optimization techniques, multiple illumination sources controllable in absolute and relative intensity by the control and conditioning module 700 are both novel and advantageous to the application.

Camera 202 and illumination source 204 are positioned axially inside protective housing 214 which serves to enclose the optoelectronic components of the glue verification subsystem 200 in a sealed manner for protective purposes as well as to provide mounting points for the glue verification subsystem 200 to be rigidly mounted to the box blank finishing machine above the area of box blank 30 where glue lines 32 are to be present.

Positioned at the distal end of protective housing 214, between both illumination source 204 and camera 202 and box blank 30, is a focusing lens 212 which focuses the light from illumination source 204 onto box blank 30 in a manner to improve illumination of the box blank 30 for the camera 202. For example, if a line scan camera technology is chosen for camera 202 then focusing lens 212 is constructed so as to gather the light from the light emitters of illumination source 204 and focus the gathered light into a narrow band on box blank 30 the orientation of said band being aligned to the fast scan axis of camera 202. This focusing adjustment of focusing lens 212 may be made upon initial set up of the glue verification sub system 200. Focusing lens 212 may be constructed of glass or some similar material of high optical quality. Optionally, an optical filter 205 may be present in front of the camera lens 203 to allow only certain wavelengths bands of light, such as UV light, through to the camera. Focusing lens 212 further provides for sealing the distal end of the optoelectronic elements of glue verification subsystem 200 inside protective housing 214.

Figure 10:
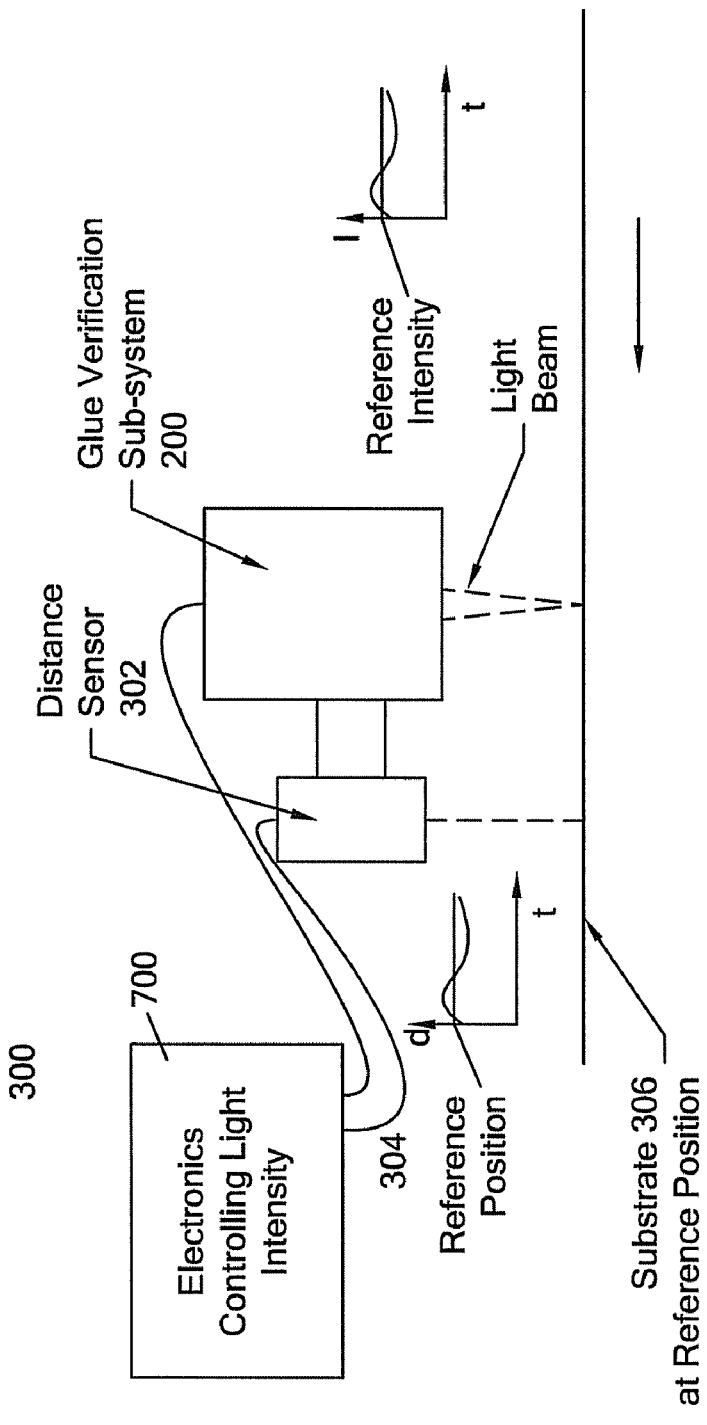
FIG. 10 is a block diagram of a substrate bounce detection system.

FIG. 10 shows the elements of substrate deflection measurement subsystem 300 to accommodate deflection of the box blank during motion in front of the optical components, such as the glue verification subsystem 200. As the box blank 302 moves through the box blank finishing machine, it may be subject to movement towards or away from the optical components. Such movement can cause fluctuations in illumination intensity and focus resulting in changes in the signal sent by the verification subsystems to the control and conditioning module 700 and further resulting in incorrect analysis of the box blank to target information. What is required is apparatus and method for judging the location of the box blank in real time relative to the optical components of the verification subsystems and, either feeding back directly this distance information into the optical performance of the verification subsystem, such as for example by controlling the exposure time of a camera in the subsystem or varying the intensity of light provided by the subsystem, or providing as additional data this distance information to the control and conditioning module 700 thereby permitting the distance of the substrate to the verification subsystem to be factored into the comparison of the box blank to the target box characteristics which occurs in the control and conditioning module 700.

The substrate deflection measurement subsystem 300, may further comprise a laser proximity sensor 302 mounted above the box blank 306 and immediately adjacent to the glue verification subsystem 200, such mounting of the laser proximity sensor 302 being either directly to the glue verification subsystem 200 or otherwise so as to prevent motion of the laser proximity sensor 302 relative to the glue verification subsystem 200. The laser proximity sensor 302 provides a signal 304 representative of its distance from the surface of box blank 306 to the control and conditioning module 700 whereby the control and conditioning module 700 determines, by means of a preloaded look-up table, mathematical formula, or otherwise, how the illumination intensity of the light source of glue verification subsystem 200 should be altered to optimize the contrast of glue to substrate signal received by the camera of glue verification subsystem 200.

By way of example, a simplistic model of the light emitters is that of a point source emitting a conical beam of light the spread of which is governed by the type of the emitter and the focusing lens 212 used. In this model, the intensity of the light incident on the substrate follows the principle of similar triangles and as such it changes by the square of the ratio between the old distance and the new distance between the emitters and the substrate. For instance, if the substrate 36 moves from a reference position, with a defined distance to glue verification subsystem 200, to a second position closer to glue verification subsystem 200 wherein the distance between the substrate and glue verification subsystem 200 is reduced by half at this second position, the resulting light incident on camera 202 of glue verification subsystem 200 is increased to a level four times greater than that light level incident on camera 202 of glue verification subsystem 200 when substrate 36 was at the reference position. Alternative, and again by the way of example, below is a look up table providing representative settings for the theoretically optimized illumination intensity of the glue verification subsystem as a function of the ratio between the distance measurement provided by substrate deflection measurement subsystem 300 and the distance at the substrate reference position. The advantage of using a look up table is that it can be further modified as a second step to allow for compensation of mathematical non-linearities in the model and the optical components themselves or for empirical measurements made in on the actual system in the field.

| Ratio of the distance measured by deflection measurement subsystem Scaling factor applied to all 300 between box blank substrate 30 illumination intensity settings of and glue verification subsystem 200 glue verification subsystem 200 and the initial reference distance | | |
|---|---|---|
| 0.50 | | 0.25 |
| 0.75 | | 0.56 |
| 1.00 | [reference position] | 1.00 |
| 1.25 | | 1.56 |
| 1.50 | | 2.25 |

Figure 11:
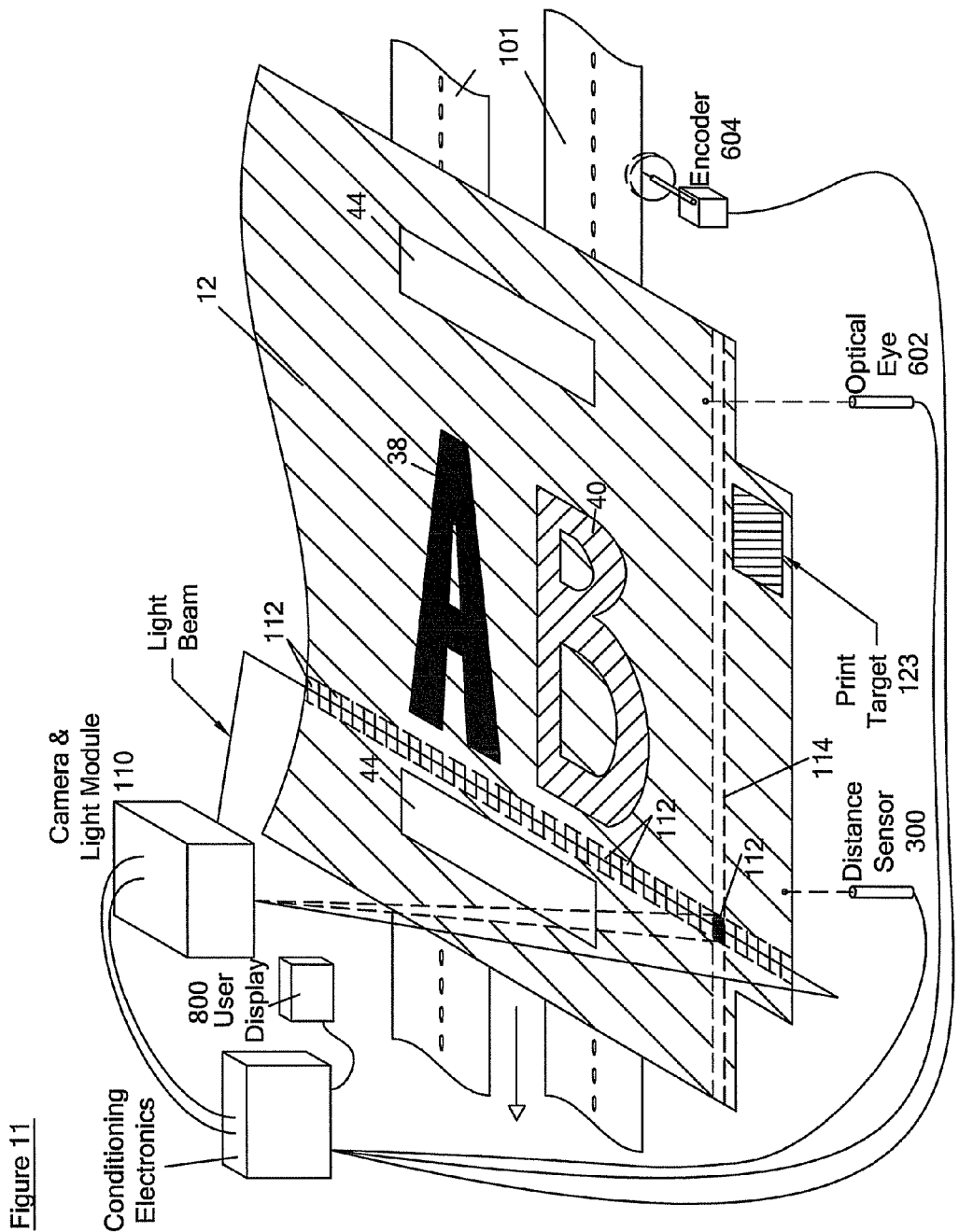
FIG. 11 is a block diagram of a print and die cut verification subsystem.

FIG. 11 is a diagram of the components of the print and die-cutting verification subsystem 110 of system 100 and components of system 100 all of which are presumed mounted on a box blank finishing machine. For clarity, only conveyor belts 101 of the box blank finishing machine are shown such conveyor belts 101 as used for translating the box blank 12 through the box blank finishing machine and past the elements of system 100.

As has been previously described, attached to the box blank finishing machine are the optical eye 602 and the encoder 604, the combination of which provide signals to control and conditioning module 700 as to the presence and location of box blank 12 with respect to the box blank finishing machine. Using these signals, and the inputs from the verification subsystems of system 100, control and conditioning module 700 may determine the position of features detected on box blank 12 by the verification subsystems and compare these to the target position of features in the desired outcome thus assuring that all features on box blank 12 are within an acceptable tolerance of the desired targets. The features of the box blank 12 checked by the print and die cutting verification subsystem 110 include die cut features, examples of which are shown by the die cuts 44, print features, examples of which are shown as first print element 38 and second print element 40 each printed in a color different from the other, and one or more print registration targets 123 which will be described later and are normally located on folding flaps or otherwise in an area which will not be visible on the final assembled box. Of additional value, system 100 provides for determining not only the correct placement and execution of each die cut, but also can determine the percentage of die cuts in aggregate which have been successfully executed on each box blank and in each job. This is advantageous where the function of the openings created by the die cut is to provide ventilation, weight saving, or some other function whose benefit is measured across an aggregate of all die cuts rather than on each individual die cut.

Optionally and advantageously attached to the box blank finishing device in the proximity of print and die cutting verification subsystem 110 is the distance sensor 300, such as has been previously described. The distance sensor 300 is used to measure the deflection of the region of the box blank 12 being imaged by the print and die cutting verification subsystem 110 towards or away from print and die cutting verification subsystem 110 thereby permitting dynamic adjustment of either or both of the illumination source 204 or camera 202 of glue verification subsystem 200 by the control and conditioning module 700 to improve the image contrast or other optical characteristics of the image of box blank 12 polled into control and conditioning module 700. Print and die cutting verification subsystem 110 is mounted with respect to box blank 12 in such a manner as to provide visual access to the full width of box blank 12 in the fast scan direction perpendicular to the travel of box blank 12 along conveyors 101.

Figure 12:
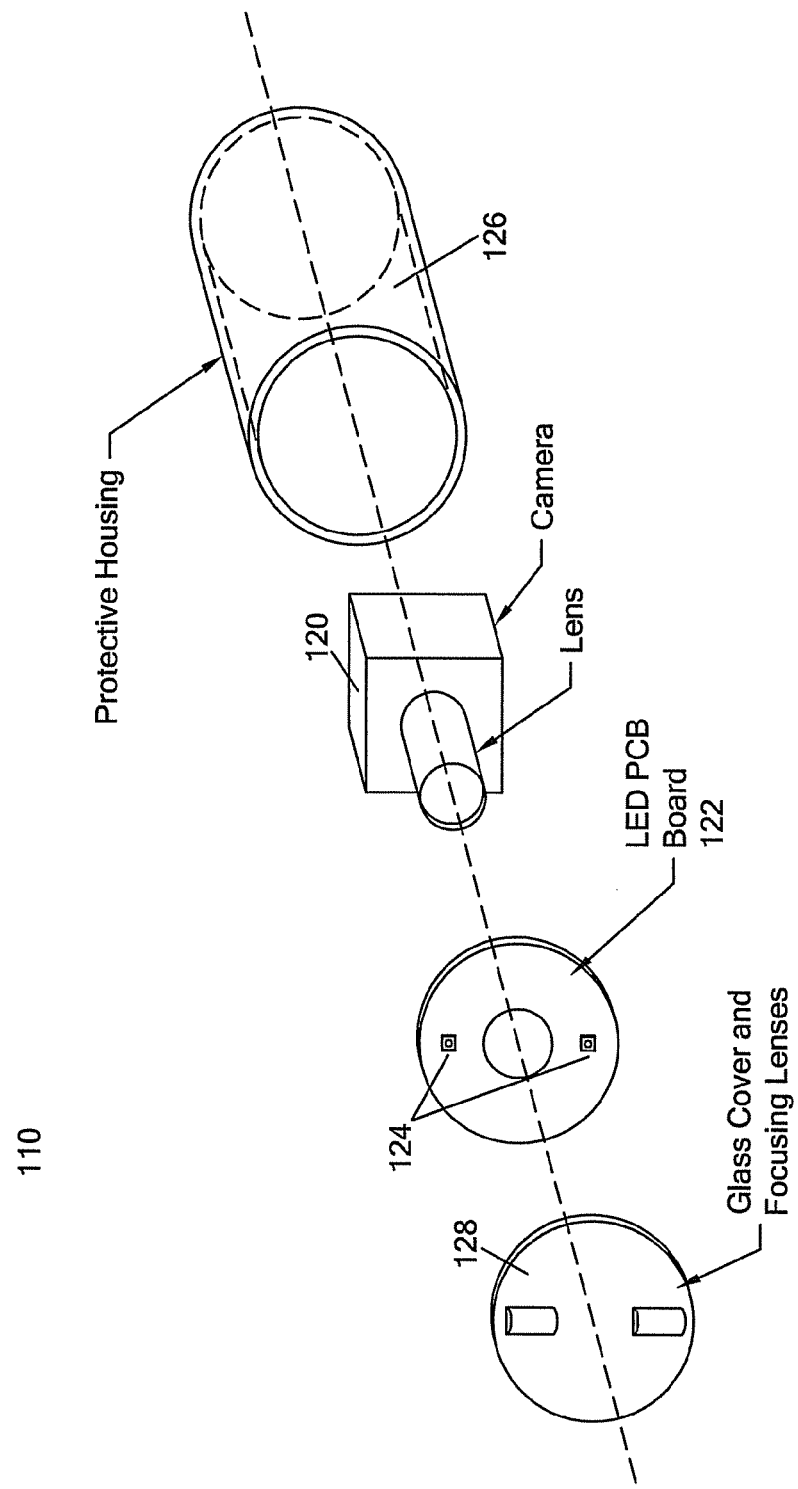
FIG. 12 is a block diagram showing an arrangement of electro-optical elements in the print and die cut verification system.

FIG. 12 shows the elements of print and die cut verification subsystem 110 which is constructed in a similar manner as glue verification subsystem 200 previously described. The print and die cutting verification subsystem 110 incorporates camera 120, preferably of a color, line-scan technology such as provided by DALSA Corporation as part #PC-30-02k80-00-R, wherein the camera 120 provides to the control and conditioning module 700 8 bits of data for each of three color channels—red, green and blue—for each pixel being imaged. A toroidal PCB 122 is mounted around the axis of camera 120 and serves to provide conditioning and power circuitry for a multiplicity of light emitters 124, wherein, on a signal from control and conditioning module 700, the relative illuminating power of light emitters 124 can be varied in intensity. The light emitters 124 preferably provide full visible spectrum "white light" across the 380 nm to 800 nm optical wavelengths. The cover and focusing lens 128 and protective housing 126 are similarly constructed and serve similar purposes on print and die cutting verification subsystem 110 as their counter-part on glue verification subsystem 200, that is, to focus the light from light emitters 124 into a line on box blank 12 and to protectively enclose print and die cutting verification subsystem respectively.

Referring back to FIG. 11, the optical resolving ability of print and die cut verification system 110 is based around the size of the pixel 112 on box blank 12, each of said pixels 112 being separately and distinctly imaged from the box blank 12 onto the pixel elements of camera 120. In practice an optical resolution of 1 mm square for pixel 112 is appropriate in most applications for resolving the print and die cut features on box blank 12 to a level necessary to determine the acceptability of said features against their desired targets, but this resolution size may be adjusted based upon specific need. In the fast scan direction camera 120 has a fixed optical resolution, commonly 4,000 pixel elements, and is used to scan or read bands 114 in the slow scan direction on box blank 12 as the box blank passes in front of the print and die cutting verification subsystem 110. The width of bands 114 in the fast scan direction, for example 1 mm each, are governed by the distance of print and die cutting verification subsystem 110 from box blank 12 and by the optical properties of focusing lens 128. The length of bands 114 in the slow scan direction, similarly 1 mm as an example, are governed by measuring the advancement of the box blank 12 with respect to print and die cut verification subsystem 110 as determined from data sent from encoder 604. In the slow scan direction when the encoder has indicated that the belt 101 upon which box blank 12 is fixed has advanced 1 mm linearly, control and conditioning module 700 generates a polling signal to camera 110 requesting it to read in a stripe of pixels 112 and provide corresponding grey scale values for those pixels to control and conditioning module 700. The polling signal may be further established such that the polling requests do not exceed the data rate limits of camera 120 or control and conditioning module 700 when the box blank finishing machine is operating at full speed. Typically the polling may be requested up to a frequency of 10 kHz without excessive cost. By sequentially scanning in pixels 112 as box blank 12 moves on conveyor 101 in front of print and die cutting verification subsystem 110, a two dimensional array of pixel data may be created in control and conditioning module 700 representative of the entire surface of box blank 12 at a resolution defined by the area of pixels 112.

For very wide box blanks, or where higher resolution is required in the fast scan direction (smaller pixels 112 and relatively narrower bands 114), multiple print and die cutting verification subsystems 110 may be placed along the fast scan direction and the images scanned from each print and die cutting verification subsystem 110 logically "stitched" together by the software and hardware of control and conditioning module 700 to create a single image of the entire box blank at higher resolution. Alternatively, if the die cut and print features of interest on box blank 12 are located in discrete bands on box blank 12, but not across the entire width of box blank 12, multiple print and die cutting verification subsystems 110 may be arranged each imaging a discrete bands.

For scanning die cut features 44 experimentation has shown that it may be advantageous when scanning the desired target box blank to temporarily increase the illumination from print and die cutting verification subsystems 110 on the box blank 12 at that point in time where die cut features 44 are travelling in front of the print and die cutting verification subsystems 110. This temporary increase in illumination should be to such a level as to cause all the color channels of the pixels of camera 120 to be driven to saturation if they are scanning a solid portion of box blank 12 regardless of whether this said solid portion of the box blank contains printed features, such as solid black printed areas, or not. The advantage of this approach is to permit more rapid and reliable capture of the die cut features as solid (non-die cut) areas of the box blank 12 can be more readily distinguished from knocked out (die cut) areas of the box blank 12 where the camera pixels have not saturated. Alternatively to increasing the illumination, the pixels of camera 120 can to driven to saturation by increasing the exposure time of the camera 120. This saturation regardless of how it is achieved is advantageous principally for the verification or "reading in" of an initial target box blank intended to be representative of an acceptable box blank. As an alternative to saturation of the pixels of camera 120 to improve contrast, known dynamic thresholding algorithms may be employed to find the edge of a die cut though this may not be as reliable as the saturation technique if patches of very black print are present in the vicinity of the die cut area.

It is apparent from the described nature of die cuts 44 and box blank 12 that print and die cut verification subsystem 110 may be additionally used to verify that the perimeter edges of box blank 12 are within tolerance absolutely, relative to each other, and relative to other features of box blank 12 with respect to the desired shape and size of the edges and features of the target box to be produced.

Once a two dimensional image array of data representative of the actual imaged surface of box blank 12, including all die cut, print and optionally print color features, has been created in the control and conditioning module 700, the values in this image array may be directly compared to a target array, said target array constructed so as to have similar dimension as the image array but populated with data representative of the desired target box. For example, if the target box is expected to have a values of R (red)=100, G (green)=100 and B (blue) =50 in the target array at a point corresponding to X=1 cm, Y=10 cm from the origin of the box blank, and the image array has values of R=100, G=100, B=100 at a similar point in its array corresponding to X=1 cm and Y=10 cm, then these values can be compared and if the difference in value for the blue color channel is outside a pre-determined threshold, the box may be marked for rejection. Such array comparison operations are well known to the art and can be performed rapidly through cross-multiplication and filtering operations of the image and target arrays to determine whether the correct elements are present in the image array to the required levels and in the correct locations on box blank 12.

Optionally included in FIG. 11 are print registration targets 123 applied to box blank 12 by printing section 14 of a flexo-folder-gluer, or some other printing device. Print registration targets are scanned by print and die cut verification system 110 and used to verify the accuracy of print registration of each printed color on box blank 12 to each other printed color. Print registration of colors must frequently be accurate to less than a millimeter in all directions or unacceptably poor quality printing may result exhibiting intra-image defects such as image moiré, poor color-over-color overlay beyond designated trap borders, etc. It is therefore apparent that the required resolution for measuring acceptable print registration is substantially higher than that resolution required to determine that the characteristics of other print and die cut features are acceptable. Print registration targets for the purpose of verifying on a printed sample the accuracy of color-to-color registration are very well known in printing technology however such targets are generally either checked by the operator "off-line" by removing a sample and inspecting it with a magnifying loupe, or require a high resolution camera focused on the print registration target location of the print sample. As a result such targets are not ideal for the current application where it is desirable to inspect every box blank, to do so as an uninterrupted step of the box blank finishing, where there are frequently significant physical constraints on the field of view available, and to employ the fewest number of cameras possible to verify the entire surface of the box blank.

Moiré, which is a visually apparent interference between two repetitive and overlaid patterns in a constructive combination, is very familiar to the printing art. However, historically, creating moiré has not been commonly employed as a printing technique for measuring misregistration as the need was not present as operators could either manually remove print samples for magnified inspection or employ high resolution cameras to measure the misregistration directly on circular targets at specific locations above the print line. Moiré is considered an objectionable print artifact to be removed through adjustment of the printing machine to bring it into alignment.

By way of illustrating the moiré effect as employed by system 100 for two specific over-printed colors, specific terms are now defined:

The base layer is a first printed image upon box blank 12 of a simple, repetitive geometric pattern, such as lines of a given thickness, and wherein the repetitive geometric pattern has a first characteristic frequency of repetition, to which the relative position of a second printed image, a revealing layer, printed upon the same box blank 12, will be compared The revealing layer is a second printed image of a similar simple, repetitive geometric pattern as the base layer, wherein the second printed image has a second characteristic frequency different from the base layer but may be otherwise similar in feature and orientation as the base layer, wherein the image of the revealing layer is made to physically overlap with the base layer, and wherein the revealing layer may be printed in a color different from the base layer Moiré is a repetitive optical beating at a yet third characteristic frequency resulting from the combination of the base layer and revealing layer The interference zone is an area upon box blank 12 exhibiting moiré wherein the base layer and the revealing layer constructively combine, or interleave, so as to reduce the amount of un-printed area of substrate of box blank 12. The interference zone contrasts with areas of the box blank 12 wherein the base layer and the revealing layer may neutrally combine, or overlap, and where therefore the area of non-printed substrate of box blank 12 is not reduced through the combined printing of the base layer and the revealing layer to an extent no greater then would be present through the printing of either the base layer or the revealing layer alone.

Optical speed up is an effect whereby the location of the interference zone upon box blank 12 moves as a result of changes to the relative position of the base layer and revealing layer.

The system 100, and specifically the print and die cut verification subsystem 110, may novely employ Moiré techniques to identify and quantify with a low resolution camera misregistration between print colors upon box blank 12. Specifically a Moiré pattern, with its constructive interference zone, may be deliberately created upon a printed target area of box blank 12 and then, through detection with camera 120 of optical speed up, any shift of this interference zone away from the ideal location in the target area can be determined FIG. 13 shows a print target 123 intended for simultaneously detecting and quantifying by the print and die cut verification subsystem 110 print misregistration between two printed colors in a single linear dimension in the registration direction shown. FIG. 13a shows two overlaid patterns of linear stripes where the stripes of the base layer 122 would be printed in the first color and the stripes of the revealing layer 124 would be printed in a second color. For clarification the Moiré effect does not rely upon the stripes of the base layer 122 and revealing layer 124 being straight but only that they be of the same shape varying only in their spacing in the registration direction. The overlaid combination of base layer 122 and revealing layer 124 create an optical beating where the period of the lines of base layer 122 and the period of the lines of revealing layer 124 combine into a pattern with a third period, the superposition image, owing to the lines of the base layer 122 and revealing layer 124 gradually and periodically alternating between more overlapping (more "white space") and more interleaving (more "dark space").

FIG. 13b provides the parameters of the two patterns of stripes of both the base layer 122 and revealing layer 124. Using these parameters the period of the superposition image can be shown to be Pm=(Pb×Pr)/(Pb−Pr), and a strong superposition image of a thick stripe with a thickness appropriate to be captured by a low resolution camera is created. A small change in the position of the revealing layer 124 with respect to the base layer 122 along the registration direction causes an optical speedup of the superposition image in the direction of the misregistration, whereby the magnitude of this speedup can be measured by camera 120 and directly related to the amount of misregistration between the color used to print base layer 122 and the color used to print revealing layer 124.

Figure 14:
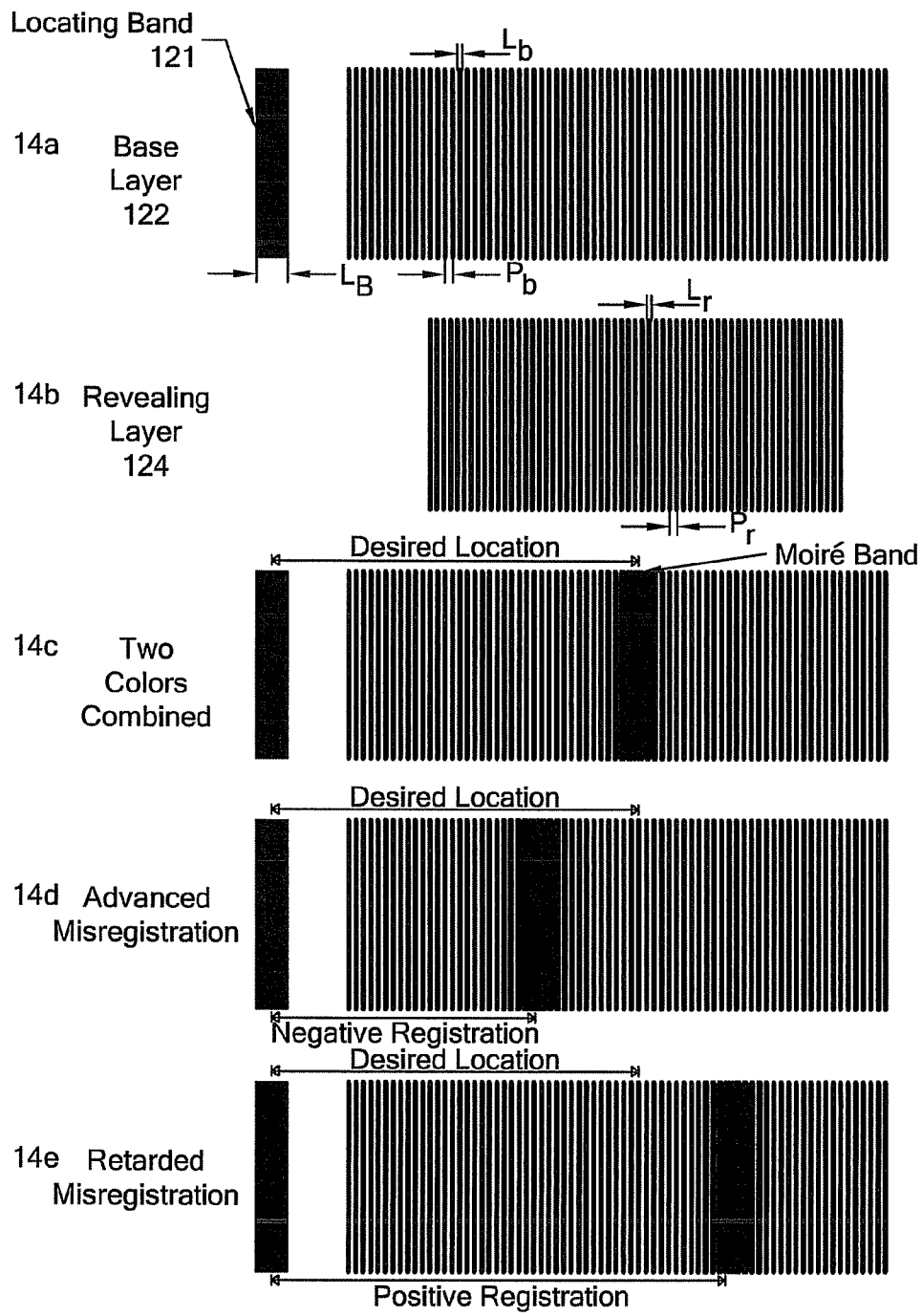
FIGS. 14a-14e illustrate optical speed up between two print colors caused by changes in registration between the colors in one dimension.

FIG. 14 illustrates a print target 119 utilizing the optical speed up effect but optimized to allow for misregistration in one dimension between two print colors to be detected and measured by a low resolution CCD camera, such as camera 120 of print and die cut verification subsystem 110. As the misregistration between the colors, and therefore the patterns printed by the colors, advances or retards the moiré band caused by the super-position of the patterns advances or retards with respect to locating band 121 in the same direction as the misregistration but at an amplified rate. The shape and size of the locating band are governed only by the requirement that it be easily detectable by the CCD camera's resolving power, and as such, the rectangular band in FIG. 14 is simply provided as an example. Thus the low resolution of camera 120 is adequate for detecting this amplified movement and control and conditioning module 700 can then determine the amount of actual misregistration. Where a camera 120 has optical resolution of 100 pixels per inch, it has been found that the characteristics of print target 119 may be as follows in the table below and will provide adequate detection and measurement of misregistration between two colors in one linear dimension.

| Characteristic | variable | Size (in inches for example resolution of 100 pixels/inch) |
| --- | --- | --- |
| Width of locating band 121 | LB | 0.200 |
| Period of base layer bands | Pb | 0.100 |
| Width of base layer bands | Lb | 0.050 |
| Period of revealing layer bands | Pr | 0.090 |
| Width of revealing layer bands | Lr | 0.045 |

Figure 15:
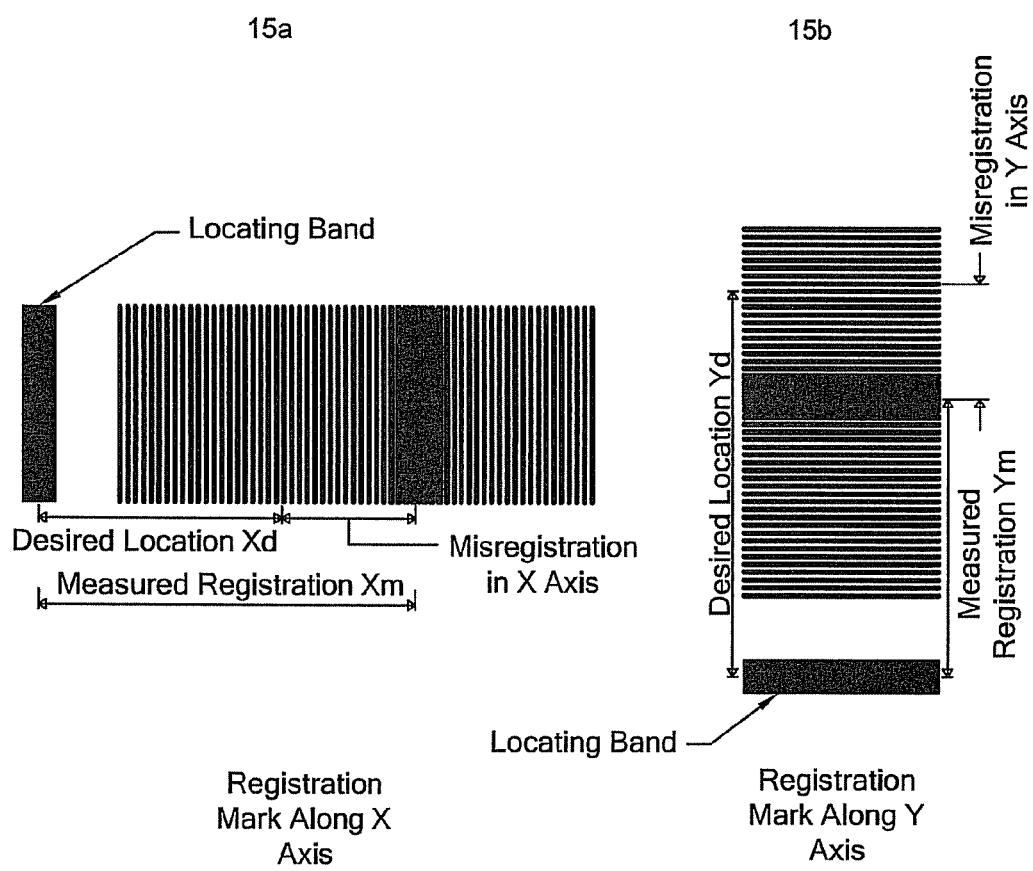
FIGS. 15a-15b illustrate print targets used by the print and die cut verification subsystem to check print registration between two colors in two linear dimensions.

FIG. 15 illustrates the print targets used by print and die cut verification subsystem 110 to check print registration between two colors in two orthogonal linear dimensions. The location of X superposition image 126 and Y superposition image 128 relative to their target locations X target and Y target provides for detection and quantification of two dimensional misregistration.

Figure 16:
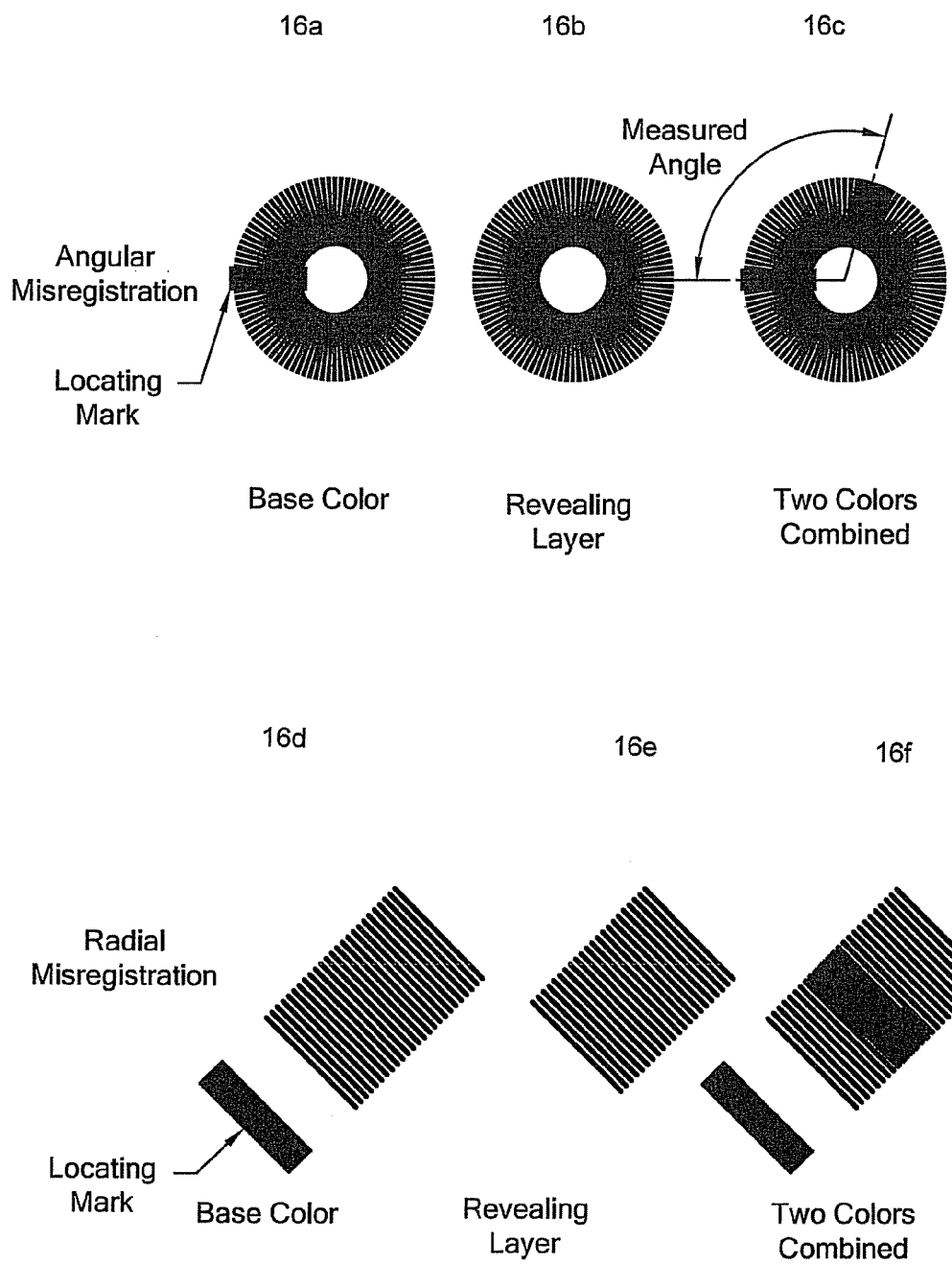
FIGS. 16a-16f illustrate the print targets used by the print and die cut verification subsystem to check print registration between two colors in either a single radial or a single angular dimension.

A misregistration of two colors on a box blank can occur in either or both of two-dimensions. This two-dimensional misregistration can be decomposed into two linear misregistration components along two directions as was described in FIG. 15 or an angular misregistration and radial misregistration as described in FIG. 16. It should be noted that radial misregistration is a specific case of linear misregistration described in FIG. 14. FIG. 16a shows an alternative embodiment of the print target 123 intended for detecting and quantifying by print and die cut verification subsystem 110 print misregistration in a single angular dimension around a target angular location. FIG. 16b shows an alternative of the print target 123 intended for detecting and quantifying by print and die cut verification subsystem 110 print misregistration in a single radial dimension around a target radial location.

It should be noted that in all of the above misregistration cases, only misregistration between two colors was considered, however printing in four or more colors is common (n colors) and therefore the need to identify and quantify misregistration across multiple colors (n−1 misregistrations) is required. The print targets are used which have been described for measuring multiple misregistrations of N colors through:
1. the designation of one color as the base color, and the other (N−1) colors as revealing colors
2. providing for 2×(N−1) combined print targets necessary to measure misregistration between N−1 color pairs in each of 2 dimensions
3. printing using the base color, (N−1) base print targets 112 upon the box blank in a first axis and (N−1) base print targets 112 upon the box blank in a second axis for each revealing color printing one revealing print target 114 upon one of the base print targets 112 on the first axis and printing a second revealing target 114 upon one of the base print targets 112 along the second axis, repeating until all base print targets 112 have been over-printed only once, and
4. measuring using the techniques described of relative misregistration of each pair of a revealing color to the base color.

Figure 17A:
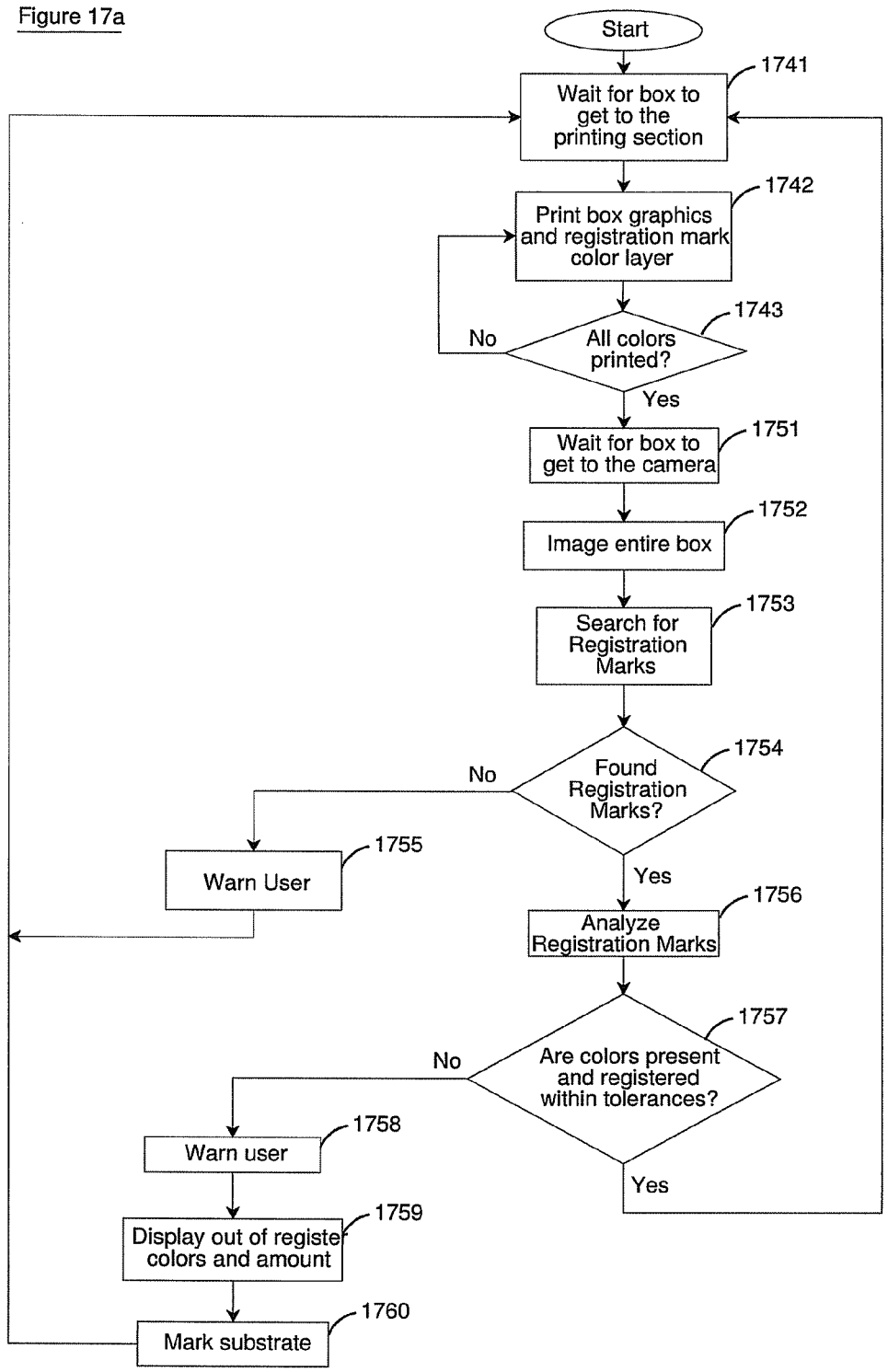
FIG. 17a is method for analyzing print registration across multiple colors.

FIG. 17a is a method for analyzing the print registration across multiple colors. At 1741, the box blank arrives at the printing section of, for example, flexo-folder-gluer 2. Passing through a first printing mechanism at state 1742, the box blank is printed with a first layer of box graphics and registration mark base layer for the current color. If at state 1743 there is yet more colors to be printed, this done so back at state 1742 with additional box graphics and registration mark revealing layers until all colors have been printed on the box blank. If all colors have been printed, at 1751, the system waits for the arrival of a box blank in front of print verification system 110. At 1752 an image of the entire box blank captured and stored in a two dimensional array of pixel data inside control and conditioning module 700. The registration marks are searched for at 1753. At 1754 if the registration marks are not found, the user is warned at 1755 and the system goes back to 1741 where it waits for the next box. If at 1754 the registration marks are found, the registration marks are analyzed at 1756. From the results, at 1757 it is concluded if all colors are present within allowed tolerances. If yes, at 1741 the system waits for the next box. If not, the user is warned at 1758, the out of register colors are displayed in 1759 along with their amount, the substrate is marked in 1760, the system awaits the next box back in state 1741.

Figure 17B:
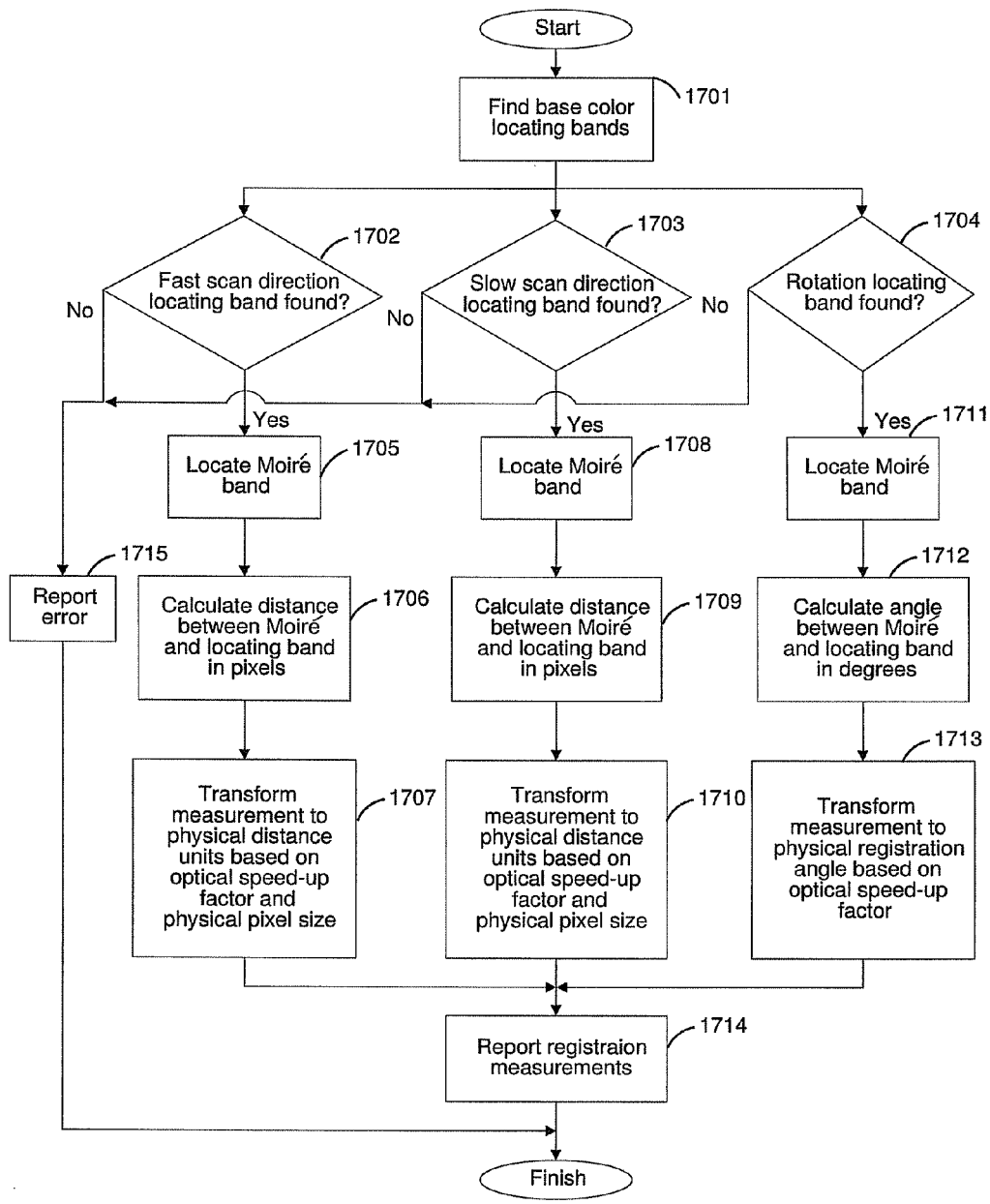
FIG. 17b is a method for detecting and quantifying print registration.

FIG. 17b is a method for detecting and quantifying misregistration of print on a box blank. After an image of a box blank has been captured and stored in a two-dimensional array of pixel data inside control and conditioning module 700, at 1701 the location of the base color locating bands of the various registration marks are determined. At 1702, if the locating band corresponding to the fast-scan direction is found, at 1705 the Moiré band is detected next. At 1706, the distance between the Moiré band and the corresponding locating band is calculated in pixels. At 1707 this measurement is transformed to physical distance units based on the optical speed-up factor and the physical pixel size. At 1703, a decision is made as to the presence of the slow-scan locating band. If it is found, at 1708 the Moiré band is detected next. At 1709, the distance between the Moiré band and the corresponding locating band is calculated in pixels. At 1710 this measurement is transformed to physical distance units based on the optical speed-up factor and the physical pixel size. At 1704, a decision is made as to the presence of the rotation locating band. If it is found, at 1711 the Moiré band is detected next. At 1712, the angle between the Moiré band and the corresponding locating band is calculated in degrees. At 1713 this measurement is transformed to physical distance units based on the optical speed-up factor. The results of 1707, 1710, and 1713 are combined to report registration measurements at 1714. If one or more of the locating bands from 1702, 1703, 1704 are not found, this is reported as an error in at 1715.

Figure 18:
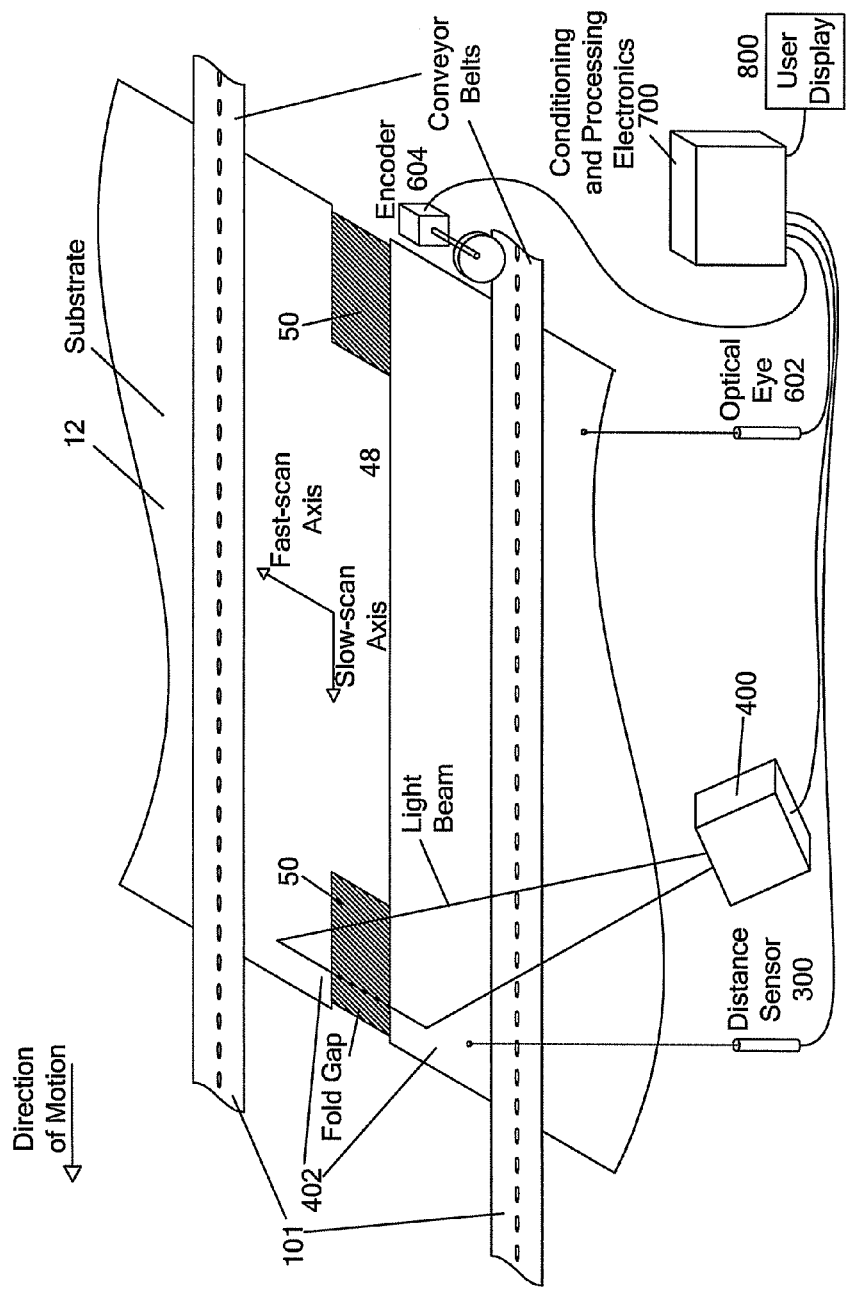
FIG. 18 is a block diagram of the elements of a fold verification subsystem.

FIG. 18 is a diagram of the components of the fold verification subsystem 400 of the system 100 in relation to other components of system 100 all of which are presumed mounted on a box blank finishing machine. For clarity, only conveyor belts 101 of the box blank finishing machine are shown such conveyor belts 101 as used to translate box blank 12 through the box blank finishing machine and past the elements of the system 100.

As has been previously described, attached to the box blank finishing machine, are optical eye 602 and encoder 604 the combination of which provide signals to control and conditioning module 700 representative of the presence and location of box blank 12 with respect to the box blank finishing machine. Using these signals, and the inputs from the verification subsystems of system 100, control and conditioning module 700 may determine the actual positioning of features detected on box blank 12 by the verification subsystems and compare these to the target positioning of features in the desired outcome thus assuring that all features on box blank 12 are within an acceptable tolerance of the desired targets. Optionally attached to the box blank finishing device in the proximity of fold verification subsystem 400 is distance sensor 300, such as has been previously described. Distance sensor 300 is used to measure the deflection of the region of box blank 12 imaged by fold verification subsystem 110 towards or away from fold verification subsystem 110 thereby permitting dynamic adjustment by control and conditioning module 700 of the imaging of box blank 12 to improve image contrast and other characteristics. Fold verification subsystem 400 is mounted with respect to box blank 12 in such a mariner as to provide visual access to the area of box blank 12 where the fold gaps are present generally in the middle of the box bank.

The elements of fold verification subsystem 400 are similar in design and construction to those of the print and die cutting verification subsystem 110. One modification to fold verification subsystem 400 from print and die cutting verification subsystem 110 is to employ a grayscale camera, as is used in the glue verification subsystem 200, rather than a color camera. Otherwise the designs of fold verification subsystem 400 and print and die cutting verification subsystem 110 may be the same, including the use of saturation of the camera pixels to improve contrast between fold gaps 50 and the folded areas 402 of box blank 12. In the case of fold verification, the illumination component of fold verification subsystem 400 may be augmented with additional external lighting established to illuminate box blank 12 from an acute angle (typically 5-10 degrees above the plane of box blank 12) there by amplifying the visual difference between the fold gap 50 and the box blank itself. This technique is effective where the folded portions of box blank 12 visible through fold gaps 50 are significantly distant from the plane of the box blank 12 containing fold gap 50. This distance depends primarily on the thickness of the board that makes up the box blank and thus the technique of additional acute lighting is most effective for verifying folds in box blanks made from thick substrate.

Fold verification subsystem 400 can be made to scan across fold gaps 50 of box blank 12 as said box blank travels in front of fold verification subsystem 400, and then communicate the image profile across these fold gaps to control and conditioning module 700 which may then determine and compare the edges of fold gaps 50, their width and parallelism, with respect to the desired target measurements for the fold gaps. If either the width or the parallelism of the fold gaps falls outside the tolerance area from the desired targets for the fold gaps the box blank can be marked for rejection, an image of the failed box blank displayed on user display 800, and record of the box blank failure kept for later review.

All of the verification subsystems so far described work in consort with control and conditioning module 700 to verify the acceptability of the measured parameters of a box blank 12 relative to the desired parameters of a target box blank. If control and conditioning module 700, upon comparison of the parameters of box blank 12 to the target parameters and their acceptable tolerances, determines that box blank 12 is unacceptable, said box blank 12 must be rejected. Referring back now to FIGS. 1 and 6, this is commonly done by marking the rejected box blank with a visible or UV fluorescing ink using marking system 500 just prior to the now processed blank 24 entering counter-ejector section 26 for final delivery to output conveyor 30 of the box blank finishing machine. The intent is that the rejected processed blanks 24 can be located in their finished stacks 28 and removed for scrapping, however such reject-markings may be over looked, or confusion may occur as to which finished stack 28 the rejected box blank resides in owing to operators adding or removing box blanks from the sequential order of their production. Consequently it is an additional benefit of providing reject sorting subsystem 550 for automatically sensing a rejected box blank within a finished stack and ejecting from the conveyor system the finished stack 28 within which the rejected box blank resides.

Figure 19:
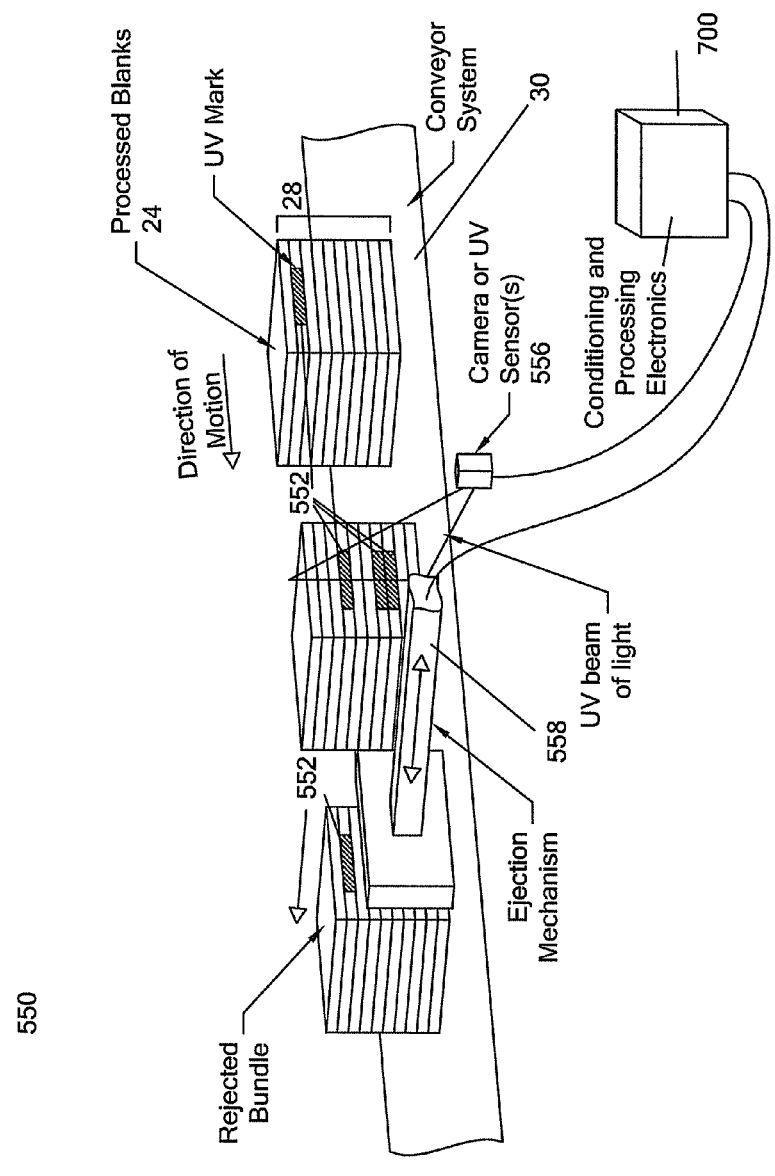
FIG. 19 is a block diagram of a reject sorting subsystem for identifying and sorting a stack of box blanks containing a failed blank.

FIG. 19 is a diagram of the elements of the reject sorting subsystem 550 used to identify and sort a stack of box blanks 28 containing a failed box blank. The reject sorting subsystem 550 comprises a UV sensor 556 oriented to read reject marks 552 upon processed blanks 24 within finished stacks 28 as they proceed on output conveyor 30, and identify for control and conditioning module 700 the presence of a reject mark within finished stack 28, thereby allowing control and conditioning module 700 to eject finished stack 28 containing a rejected box blank using ejector 558.

Figure 20:
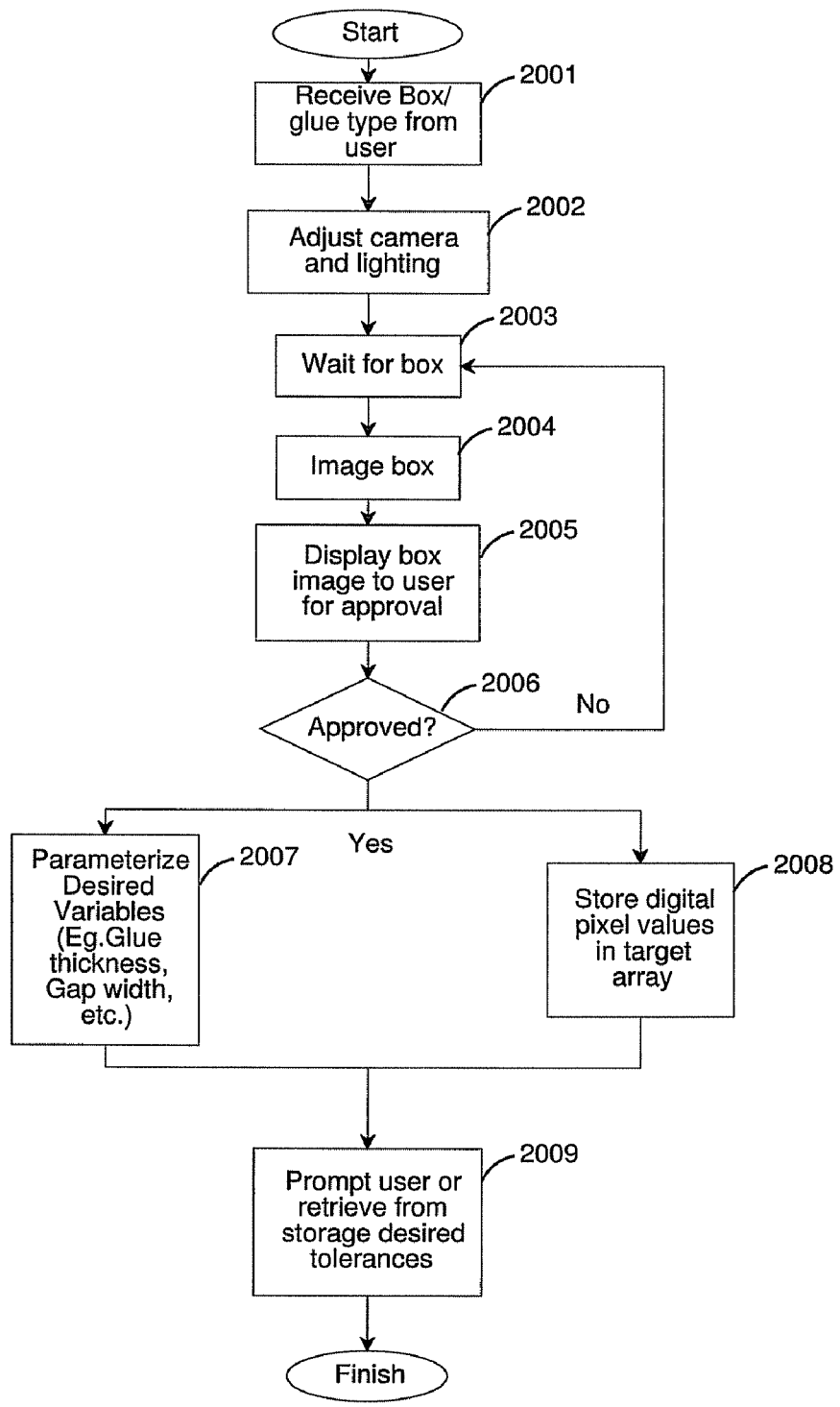
FIG. 20 is a method for inputting desired target parameters of a box blank finishing operation.

FIG. 20 is a method for inputting the desired target parameters of a box blank finishing operation into the system through either direct user input or "learning" from an acceptable box. At 2001 the box and glue type choices are received from the user. The camera and lighting are adjusted at 2002. The system waits for the arrival of a box at 2003. The box is imaged at 2004. The image of the box is displayed to the user at 2005 for approval. If at 2006 the user does not approve the box, the system waits for the arrival of the next box at 2003. If the box is approved at 2006, the desired box parameters such as the number of glue lines, the thickness of glue lines, and width of the fold gap are parameterized from the image at 2007. At 2008 the image digital pixel values are stored in target array for future direct comparison. At 2009, the desired tolerances are retrieved from storage or by prompting the operator.

Figure 21:
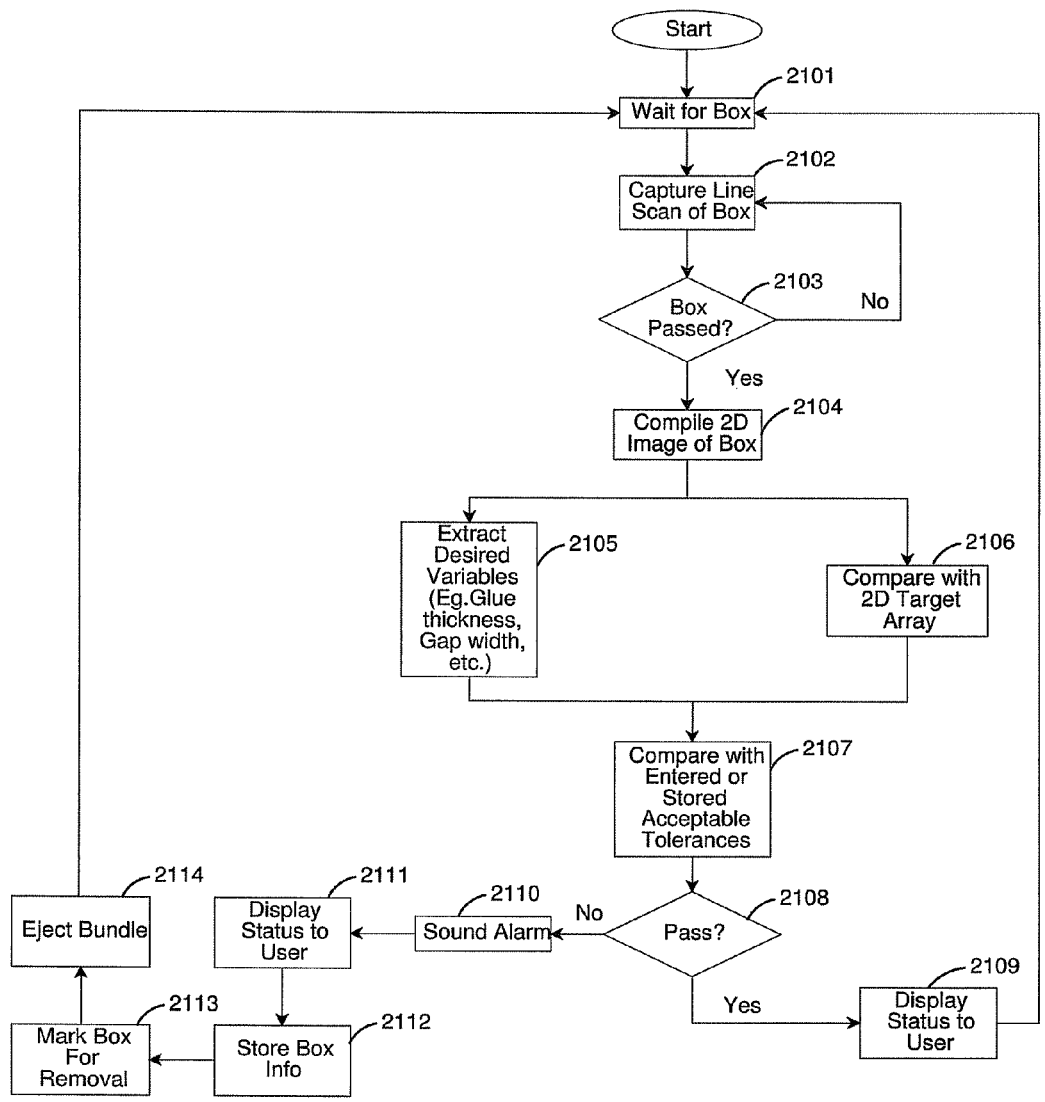
FIG. 21 is a method for determining the acceptability of a box blank.

FIG. 21 is a method for determining the acceptability of a box blank. At 2101 the system waits for the arrival of a box. At 2102, a line scan of the box is captured. At 2103 if the box has not fully passed the camera, at 2102 another line scan of the box is captured. This repeats until the entire box has been imaged at which point at 2104 a two-dimensional (2D) image of the box is compiled. At 2105 the desired variables such as the number of glue lines, the thickness of glue lines, and width of the fold gap are extracted from the image. At 2106 a direct comparison between the digital pixel values and the target array is made. At 2107 the results are compared with the entered or stored acceptable tolerances. At 2108 a decision is made as to whether the box has passed inspection. If yes, at 2109 the status is displayed to the user and at 2101 the system waits for another box. If no, the alarm is sounded at 2110, the status is displayed to the user at 2111, box info is at 2112, the box is marked for removal at 2113, the corresponding bundle is ejected at 2114, and the system waits for another box at 2101.

It will be understood by those skilled in the art that various changes may be made and equivalents may be substituted for elements thereof without departing from the scope of the present disclosure. In addition, many modifications may be made to adapt a particular situation or material to the teachings of the invention without departing from the essential scope thereof. Therefore, it is intended that the disclosure not be limited to the particular embodiment disclosed as the best or only mode contemplated, but that the invention will include all embodiments falling within the scope of the appended claims.

We claim:

1. A method for inspecting a feature applied to a box blank during manufacture of a paper box, comprising the steps of:
   illuminating at least that portion of box blank including said feature with an illumination source;
   receiving an image of the illuminated portion of the box blank from at least one optical sensor;
   varying a characteristic of the illumination source for optically distinguishing between said feature a surface of said portion of the box blank to which said feature is applied;
   comparing said received image to a stored product profile containing an optimal image of said feature to determine if features in said received image are similar to said features in said stored product profile; and
   using said comparison to indicate when the box blank does not conform to said product profile.

2. The method of claim 1, said characteristic being a wavelength of said illumination source.

3. The method of claim 1, said characteristic being an intensity of said illumination source.

4. The method of claim 1, said visual distinction being contrast.

5. The method of claim 1, said optical distinguishing being a contrast.

6. The method of claim 1, said feature being a glue line.

7. The method of claim 1 wherein the optical sensor is a charge coupled device camera.

8. The method of claim 7, said camera being a linear scan camera.

9. The method of claim 1 said step of comparing includes creating a two-dimensional model.

10. The method of claim 1 further comprising creating a two-dimensional image representation of the blank for display on a monitor.

11. The method of claim 1 further comprising varying the wavelength of the illumination source before said comparing step.

12. The method as in claim 1, wherein an intensity of a dominant wavelengths of light of said illumination source is adjusted according to a lookup table relating the intensity to a surface material of said box blank and a glue applied thereto.

13. The method of claim 1 wherein said characteristic of the illumination source is determined by a reference glue and box substrate combination and wherein the illumination source is adjusted in discrete steps around a set point wavelength value, and for each discrete step in wavelength the image of the reference glue and substrate combination is received by the optical sensor, contrast of the received images at each discrete wavelength step is recorded, and a preferred wavelength of the illumination is established where a contrast between the glue and substrate is optimised.

14. The method of claim 8 wherein the received images are transferred to a control and conditioning module, the images are collectively analyzed by the control and conditioning module so as to determine a point of maximum contrast, and a wavelength of the illumination source is set by control and conditioning module to the point of maximum contrast.

15. The method of claim 1 including marking a box with a UV responsive or color dye when said box does not conform.

16. The method of claim 1 said boxes being on a conveyor line further comprising subsequently detecting the presence of the UV mark or color die on the box, in a stack of boxes and thresholding the data to determine if box should be ejected.

17. The method of claim 16 further comprising moving said entire stack of boxes off the conveyor line if a UV mark or color die is detected in said stack.

18. The method of claim 1 further comprising:
determining a distance of the box blank from the optical sensor by a distance sensor; and
adjusting the characteristic of the light source using the determined distance and image data received from the optical sensor to compensate for changes in the distance of the box blank from the camera.

19. The method of claim 18 wherein the characteristic is intensity.

20. The method of claim 18 including adjusting an exposure time of said optical sensor.

21. The method of claim 19 wherein the intensity of the light source is adjusted according to a look up table relating light intensity needed to the distance measured.

22. The method of claim 19 wherein the intensity of the light source is adjusted based on the square of the change in distance.

23. The method of claim 1 wherein the feature is a die-cut and further comprising:
adjusting the intensity of the light source by using high light intensity to wash out print that may exhibit similarities with the die-cut, and thresholding the image to locate the die-cut profile.

24. A system for checking the quality of paper box blanks during manufacture, the system comprising:
at least one optical sensor oriented to view a selected paper box blank on a conveyor line;
an illumination source with variable wavelength to illuminate the selected box on the conveyor line;
a control and conditioning module for capturing an image of the selected box from the at least one optical sensor and determining if features in an image received from the at least one camera corresponds to stored values of a target box; and
a user display for displaying the selected box and identifying to a user if the selected box matches values stored for the input target box.

25. The system of claim 24 wherein the illumination source is automatically adjusted such that the wavelength characteristic of the illumination source is changed to optimize the contrast of a glue line against a substrate.

26. The system of claim 24 wherein the illumination source contains a plurality of discrete illumination elements providing two or more discrete wavelengths.

27. The system of claim 26 wherein the discrete illumination elements are independently adjustable in intensity.

28. The system of claim 27 wherein the level of intensity of the discrete illumination elements, as determined by the optical output sensor, is varied so as to maximize the contrast of a glue line against a substrate.

29. The system of claim 24 further comprising a mechanism to measure the quality of print registration.

30. The system of claim 24 further comprising an optical sensor to measure the quality of the fold gap against target box fold gap values.

31. The system of claim 24 further comprising:
a distance sensor for determining a distance of the box blank from the optical sensor and for using the determined distance to adjust the characteristic of the light source to compensate for changes in the distance of the box blank from the optical sensor when image data is received from the optical sensor.

32. The system of claim 31 including adjusting an exposure time of said optical sensor.

33. The system of claim 31 said characteristic being an intensity of said light source.

* * * * *